United States Patent [19]
Maccabee et al.

[11] Patent Number: 6,108,700
[45] Date of Patent: Aug. 22, 2000

[54] APPLICATION END-TO-END RESPONSE TIME MEASUREMENT AND DECOMPOSITION

[75] Inventors: Mark M. Maccabee, Monsey, N.Y.; W. Nathaniel Mills, III, Coventry, Conn.; John Joseph Edward Turek, South Nyack, N.Y.

[73] Assignee: International Business Machines Corporation, Armonk, N.Y.

[21] Appl. No.: 08/904,882

[22] Filed: Aug. 1, 1997

[51] Int. Cl.⁷ ............................. G06F 17/00; G06F 11/34
[52] U.S. Cl. .......................... 709/224; 709/318; 709/328; 714/38; 714/47
[58] Field of Search .................................... 709/223, 224, 709/101, 313, 310, 318, 328, 329; 714/38, 39, 37, 47

[56] References Cited

U.S. PATENT DOCUMENTS

| | | | |
|---|---|---|---|
| 4,369,493 | 1/1983 | Kronenberg | 713/502 |
| 5,428,789 | 6/1995 | Waldron, III | 709/103 |
| 5,504,894 | 4/1996 | Ferguson et al. | 707/2 |
| 6,006,260 | 12/1999 | Barrick, Jr. et al. | 709/224 |

OTHER PUBLICATIONS http://www.tivoli.com/n_appsman/armwhitepaper.html, Home Tivoli "Managing Application Performance with TME10", Tivoli Systems, Dec. 5, 1996.

http://www.hp.com/openview/rpm, "Overview of the Application Response Measurement API", Hewlett Packard Co., 1995.

http://www.vitalsigns.com/product/netmedic_brochure/index.html, "Net.Medic", Product Brochure, Vital Signs Software.

http://www.vital signs.com/product/netmedic_preview/index.html, "Net.Medic", Product Preview, Vital Signs Software.

http://www.vitalsigns.com/product/netmedic_whitepaper/index.html, "Optimizing Inernet Performance", Vital Signs Software.

(List continued on next page.)

Primary Examiner—Dung C. Dinh
Attorney, Agent, or Firm—David M. Shofi, Esq.; Kevin M. Jordan, Esq.

[57] ABSTRACT

A method, computer program product and a program storage device embodying software for measuring of the response time of an application (including distributed applications in a client/server or Internet environment) as perceived by an end-user. One aspect deals with the measurement of components of the response time and relating those components to user response time. In addition, the components of one transaction can be matched (or correlated) to each other even though they are measured on different systems. The generation of events and transactions can be controlled, allowing their creation to occur as close to their point of origin as practical. Both aggregate and detail reporting facilities provide overall performance and availability information as well as exceptions and/or detail transactions including the decomposition of overall availability and performance metrics into smaller measurements representing the contribution made by select transaction components. An interactive reporting facility enables the selection of a level of transaction decomposition desired. This enables the identification of the transaction components that are introducing delays or faults. The system is extensible, enabling the addition of components to the system that extend its measurement and reporting capabilities. In particular, a language has been created to facilitate the definition of the end-to-end business application transactions. Also, select APIs as well as application data structures allow the addition of software and/or hardware modules to extend the system. The system can also adapt to the presence or absence of select streams of events without having to change its mode of operation. Measurement sources that generate events can be dynamically activated and deactivated.

36 Claims, 18 Drawing Sheets

OTHER PUBLICATIONS

"Application Response Measurement" API Guide, Hewlett Packard Co., and IBM Inc., First Edition—Jun., 1996.

http://www.hp.com/openview/rpm/papers/armwp.htm, "Managing the Enterprise with the Application Response Measurement API (ARM)", Denise Morris, Hewlett Packard Co.

http://www.candle.com, "Candle News Announcement", Candle Corporation, 1995–1997.

CICS/ESA Performance Guide, Version 4, Release 1, Document Number SC33–1183–00, IBM Corp., 1982, 1994.

NPM Concepts and Planning, Book Cover, Version 2, Release 2, Document Number GH19–6961–01, IBM Corp., 1984, 1994.

"Distributed Client/Server End–to–End Response Time: Instrumentation, Methodology and Experience with a Commercial Product" M. Maccabee et al., Computer Measurement Group Conference Proceedings, Dec. 1996.

http://www.hp.com/openview/rpm/arm/docs/mwaguide.htm, "ARM–Enabling Your MeasureWare Agent", Hewlett Packard Co., Aug. 1996.

CMG96, "Client/Server End–to–End Response Time: Real Life Experience", M. Maccabee, Computer Measurement Group Conference Proceedings, Dec. 1996.

"In Search of End–to–End Response Time", R. Ralston, Computer Measurement Group Conference Proceedings, Dec. 1995.

| API's | Functional Description |
|---|---|
| start() | Activates the sensor and establishes communications with Agent |
| makeEvent() | Causes Event Generator to create an Event of specified type with specified attributes |
| addCorrVar() | Appends specified Correlation Variable data to specified Event |
| sendEvent() | Sends specified Event to Agent |
| deleteEvent() | Deletes resources allocated to specified Event |
| stop() | Inactivates the Sensors and stops communications with Agent |
| isActive() | Queries the state of the Sensor (e.g., active (started) or inactive) |
| requestEvent() | Solicites or cancels receipt of specified Events from specified supplier |

Fig. 15

APPLICATION END-TO-END RESPONSE TIME MEASUREMENT AND DECOMPOSITION

FIELD OF THE INVENTION

This invention generally relates to the Service Level Management (SLM) field where programs measure the performance, utilization and availability of computers or the work done by computer applications. A more particular aspect is related to measuring the response time of a user transaction and relating it to the expected response time.

BACKGROUND OF THE INVENTION

End-to-end response time ("ETE RT") refers to the time a user experiences in interacting with a computing system. It is typically the duration between the start of a user's request (e.g., indicated by depressing a key or a button) and the time when the user can use the data supplied in response to the request. Thus, end-to-end response time represents a user orientation in performance management as contrasted with resource oriented performance metrics such as CPU utilization or I/O rate.

ETE RT bridges the business and technical worlds. On one hand, the end-to-end response time of a transaction can be associated with a business transaction performed by the application. On the other hand, end-to-end response time of a user transaction is also related to the resources consumed by the transaction. Thus, ETE RT serves a very important link between the business understanding of computer use and the technical understanding of the system (see e.g., Richard S. Ralston. In Search of End-to-End Response Time. *Computer Measurement Group Conference Proceedings,* December 1995).

ETE RT is available and is used today to some degree in a mainframe environment. For example, combined CICS/VTAM, two subsystems of MVS, have such a facility (see "CICS/ESA Performance Guide for Release 4.1," IBM Corporation, 1996, SC33-1183-00). However it works only on those subsystems and provides no decomposition measurement or correlation. The NetView Performance Monitor (NPM) product allows measurement of total ETE RT in an MVS/VTAM environment for some limited circumstances (see "NetView Performance Monitor" (NPM), IBM Corp., Product Number 5665-333. Manual GH19-6840-01). NPM, which is terminal-based (unlike the client/server environment), does not decompose this total time. ETE RT is just emerging in a client/server environment. Despite the importance of ETE RT, there are surprisingly few established products to measure it. This is one indication of the degree of technical difficulty to produce such a facility.

The Application Response Measurement API and SDK (available from the Hewlett-Packard and Tivoli WebSites (http://www.hp.com/go/arm and http://www.tivoli.com/ARM) define and support an API that allows indication in an application of when a transaction starts and when it completes. The ARM API is supported by products such as those by Tivoli Systems under the trademark TIVOLI REPORTER (see http://www.tivoli.com) and by Hewlett-Packard Corporation under the trademark MEASUREWARE (see http://www.hp.com)). Neither the ARM API nor these products have the capability to measure components of response time and aggregate those components into a performance profile of each transaction.

Another product, sold by VitalSigns Corp. under the trademark NET.MEDIC (see http://www.vitalsigns.com), allows the measurement of response time at an Internet browser. It does not do measurements of the server computer and performs no correlation.

Still another product, sold by Candle Corporation (http://www.candle.com)] under the trademark ETEWATCH, measures the total response time of an Internet browser but provides no decomposition of the response time.

Yet another product, sold by Computer Associates Corp. under the trademark NETSPY, captures packet headers and provides a measurement of ETE RT for a limited set of standard applications. It uses certain assumptions (perhaps incorrect) about a packet's content and order for those applications. The product does not provide decomposition of ETE RT.

Another product, sold by the Network General Corp. under the Trademark SNIFFER, allows A comprehensive collection of network traffic (packets) and a fairly large set of analysis programs. Some of those programs provide an indication of ETE RT. In general, it is a network traffic analyzer and has a limited ETE RT capability. The product does not provide decomposition of ETE RT.

ETE RT measurement is one of the key measures of service levels provided by the computing equipment. In many companies ETE RT is tracked at the executive level (especially in the case of CICS).

This is how user satisfaction is measured. When computing equipment is upgraded, the improvement in ETE RT serves as one indication of the effectiveness of the upgrade. The client/server environment in general is more end-user oriented. Also, the equipment in this environment comes in less expensive units, which tends to reduce the importance of resource oriented measurements. Thus the introduction of ETE RT measurements and the methodology of its use in client/server environment are of significant business interest (see "Distributed Client Server End-to-End Response Time: Instrumentation, Methodology and Experience," by Mark M. Maccabee, Anna Long, and Walter Schwane, *Computer Measurement Group Conference Proceedings,* December 1995.; and "Client/Server End-to-End Response Time: Real Life Experience," by Mark M. Maccabee, *Computer Measurement Group Conference Proceedings,* December 1996. Since the client/server environment is relatively new and not well understood, introduction of an ETE RT facility presents a significant technical challenge.

Once the user response information is available to users, their interest shifts. They want and need more details about the user transaction (to decompose it). In client/server systems, for transactions deemed to take too much time, the user wants to how much of the time was spent in the client, in the network and in the server. This need comes from the underlying business question: since the system is too slow, which of its three main components needs to be worked on (to tune it, to fix it, to upgrade it).

There are patents directed to various aspects of response time. For example, U.S. Pat. No. 5,504,894, entitled "Workload Manager for Achieving Transaction Class Response Time Goals in a Multiprocessing System" does not provide ETE response time measurements. Rather it measures the server (mainframe) component of response time and claims to improve it automatically. U.S. Pat. No. 5,428,789, entitled "Method and Apparatus for Optimizing User Response Time in a Priority Preemptive Operating System" similarly is directed to improving response time rather than measuring and decomposing it.

U.S. Pat. No. 4,369,493, entitled "Response Time Monitor" describes a hardware system that tracks the characteristic of a computer terminal to measure ETE RT. It does not deal with decomposition. The value of terminal based measurement facility such as this is greatly diminishing because of the move to more modem workstations.

Thus, there is a need for an improved method and system for measuring and reporting availability and performance of end-to-end business transactions. There is also a need for a means to copy or derive information necessary for correlating and collating select measurement events into transactions that describe the behavior of end-to-end business transactions as it applies to availability and performance metrics. There is a further need for the system to correlate and associate transactions occurring at different measurement points within the path taken by a business transaction so availability and performance can be assessed at select points along the path, decomposing the overall availability and performance into its component parts at or between these select points. The present invention addresses these needs.

SUMMARY

In accordance with the aforementioned needs, the present invention is directed to an improved method and system for measuring and reporting availability and performance of end-to-end business transactions.

The present invention has features which enable the derivation of information necessary for correlating and collating select measurement events into transactions that describe the behavior of end-to-end business transactions as it applies to availability, performance (response time), capacity, and utilization metrics. An example of the application to availability is that transactions can be formed even if not all the events are available. An example of the application to system capacity is that since the duration of a single event can be measured, the number of events per unit time can also be calculated. An example of the application to system utilization is that once the number of transactions per unit time are known, this can be compared to a maximum number of transactions per unit time.

The present invention has other features which can correlate and associate transactions occurring at different measurement points within the path taken by a business transaction so availability and performance can be assessed at select points along the path, decomposing the overall availability and performance into its component parts at or between these select points.

The present invention has still other features which can control generation of events and transactions, allowing their creation to occur as close to their point of origin as practical, thereby reducing data volumes and distributing system workloads as widely as possible, minimizing impact on the communications and storage requirements for the system, and minimizing impact on the business transaction components the system is measuring.

The present invention has yet other features which can provide both aggregate and detail reporting facilities to enable customers to glean overall performance and availability information as well as to examine exceptions and/or detail transactions including the decomposition of overall availability and performance metrics into smaller measurements representing the contribution made by select business transaction components.

The present invention has other features which provide interactive reporting facilities enabling customers to select the level of transaction decomposition they wish to view. The interactive reporting facilities enable customers to glean which business transaction components are introducing delays or faults that adversely affect the business transaction.

The present invention has still other features which provide such a system with extensions enabling customers and other developers to add components to the system that extend its measurement and reporting capabilities. In particular, a language has been created as part of this invention to facilitate the definition of the end-to-end business application transactions. Also, select application programming interfaces (API's) as well as application data structures (ADS's) belonging to the system will be documented to permit the addition of software and/or hardware modules to extend the measurement and/or reporting facilities of the system.

The present invention has yet other features which provide flexibility in its data management whereby the absence of measurement events is tolerated by system and the transactions it generates remain valid, but do not include the missing information. This enables the system to adapt to the presence or absence of select streams of events without having to change its mode of operation. Customers or other developers can dynamically add measurement sources that generate events and the system will accommodate the new arrival of these events without adverse affects.

In one embodiment of the present invention there are three stages of activity: Event Generation, Transaction Generation, and Report Generation, as well as an overall management of the System accomplished through System Administration.

Business Transactions range from the very simple, to very complex. A business transaction may include a single directive where one system "tells" another to do something without soliciting a response. An example might be having a system broadcast the current stock price for a given company. A business transaction may include multiple directives each of which may or may not require a response where one system tells several other systems to do something and depending upon the responses, it continues to solicit actions to be taken by systems in order to complete the desired affect. An example might be having an order taken update the inventory and customer credit information.

End-to-end business transactions represent all the processing stages (e.g., directives and responses) that comprise the business transaction as events contained within one or more associated transactions. This invention measures these processing stages and the communications between them by using Sensors.

Sensors monitor for select changes in state using a variety of methods to glean which activities are being achieved: insertion of probes; registration for callback on select exits; or interception of directives and responses issued by the activity. Sensors compare the changes in state against rules used to generate events. If the change in state is such that an event can be generated, the Sensor further checks control rules (e.g., filters) to determine if it may generate the event. When appropriate, the sensor generates an event that describes the change in state, when and where it has occurred, and any extra data necessary to uniquely identify the event (e.g., an event describing that a file has been opened might include the name of the file as well as the file handle returned by the open activity for use in subsequent file accesses). An event contains a time-stamp and correlation data used later by the system to associate the event with other events into transactions. Examples of correlation data include but are not limited to one or more of an IP address, Socket ID, file handle, database name, document number, user ID, machine ID, process ID, thread ID and application ID. In other words the correlation data can be any data which represent a common thread running through a transaction and which, according to the present invention, can be used to associate the event with other events into transactions.

Sensors forward the events they generate to their Agents for temporary storage and distribution to other system components that have registered interest in knowing that a select event has occurred. One such process is the (Event) Processor. The Processor is also an event generator using rules and controls like the Sensor, except it determines changes in state by analyzing events instead of directly monitoring activities taken by business applications or the platform components on which they run. Processors generate events that may result from (but are not limited to) aggregations of events (e.g., start of batch of sends, end of batch of sends), or from series of events (e.g., first open, last close), or from further analysis of the correlation data within events (e.g., open of networked file vs. open of local file). Processors also forward the events they generate to their Agents. Because no new information is added to the "system" once events are formed, the event generation used by sensors and processors must copy data from application data, or must derive their own data based on event analysis (e.g., aggregate data might be derived) and place this data within correlation data belonging to events.

Another system component that may register for events is the Transaction Generator. Just as Sensors and Processors use rules and controls to glean whether they can and may generate events, the Transaction Generator uses rules and controls to glean whether it can and may generate transactions. The Transaction Generator is managed by a Director that communicates with Agents to retrieve select events needed by the Transaction Generator to generate transactions. Events retrieved by the director are presented to the Transaction Generator who in turn assesses the content of the event (e.g., time-stamp and correlation data) to determine if the event should begin a new transaction, and/or if the event should be incorporated within an existing "work-in-progress" transaction. The rules used by the Transaction Generator originate in a human readable language format that is later converted into binary format capable of being interpreted by the Transaction Generator. Transactions are collations of correlated events, and contain the events as well as the "links" that show the relationships among these events. Based on the transaction generation rules, and the arrival of events, when a transaction is completed (e.g., no longer "work-in-progress") it is presented to the Director where it is temporarily stored pending distribution to other system components that have registered interest in knowing when select transactions have been generated.

One such system component interested in transactions is a Transaction Store. The Transaction Store is maintained by a Manager that communicates with Directors to retrieve select transactions. The Transaction Store is a repository for transactions and maintains them in their original state as well as storing aggregate records built from transactions. These aggregate records are in support of the Report Generation facilities of the System as described further on in this narrative. The Transaction Store may also work with other Transaction Stores to manage their transactions in a manner that expedites report generation.

Report Generation involves the retrieval and manipulation of transactions to glean information relating to availability and performance of business transactions. Just as event and transaction generation used rules and controls in the creation of their output, so do the Report Generation facilities of this invention. Generation of reports includes definition of the initial selection and processing of transactions, as well as the sorting and aggregation methods used to consolidate the transactions' event data into availability and performance information.

BRIEF DESCRIPTION OF THE DRAWINGS

The foregoing and other objects, features and advantages will be better understood from the following detailed description of the invention with reference to the drawings wherein:

FIG. 15 depicts examples of ETE APIs according to the present invention.

DETAILED DESCRIPTION

Figure 1A:
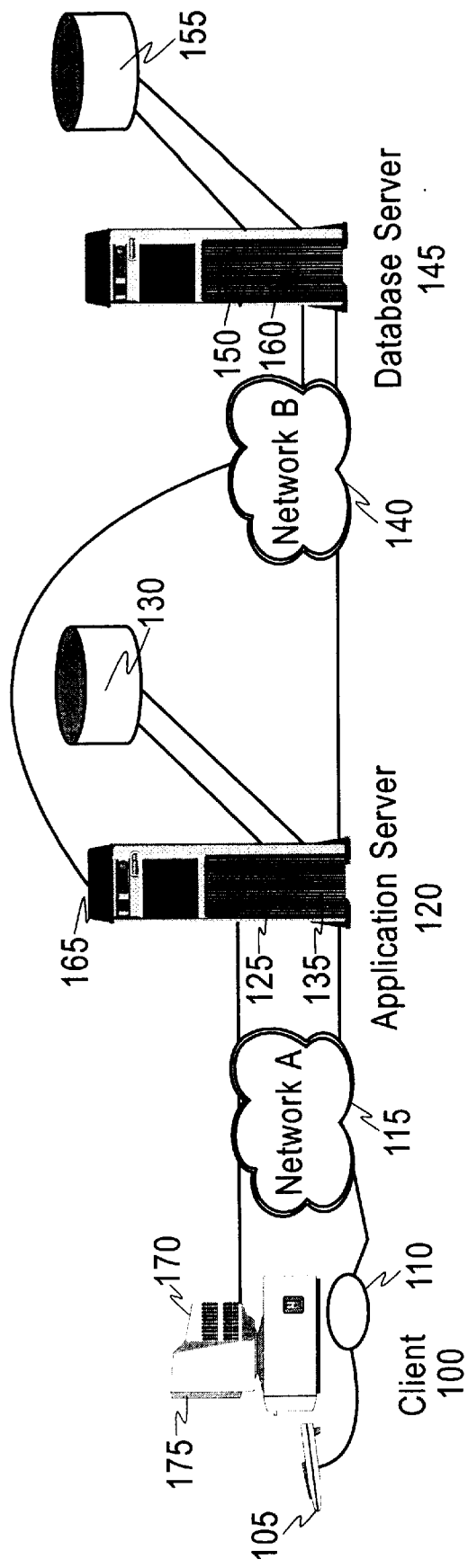
FIG. 1A depicts an ETE Service Level Management System (SLMS) Example Transaction.

FIG. 1A depicts an example of a client-server application architecture with which the features of the present invention can interact to produce information. As depicted, a client (100) is used to initiate a request, for example via keyboard (105). Requests, however, could be initiated by any conventional means such as by mouse click, voice command, bar code swipe, etc. Examples of the client (100) are personal computers, kiosks, data entry terminals, scanners, telephones, pagers, etc. The request is acted upon locally (110) where the request is formulated and forwarded to an application server (120) via a network (115). Examples of the network (115, 140) and communication protocol are socket-based communications riding on TCP/IP transport across a local area network (LAN) that is connected by router to a wide area network (WAN) containing many switching locations that create a virtual circuit to a service provider and eventually to an application server. Examples of the application server (120) are high-end personal computers, RISC-based PowerPC's, UNIX-based workstations, minicomputers, or mainframe computers running software fielding requests from clients and distributing the requests to appropriate back-end database servers when appropriate. For discussion purposes we will describe an electronic commerce transaction initiated within a web browser to purchase an item using the Internet (note, however that the invention is intended to work with any form of transaction). Examples of web-based application servers include, but are not limited to those sold by Microsoft under the trademark INTERNET INFORMATION SERVER, by SAP under the trademark SAP R3, or by Lotus under the trademark LOTUS NOTES SERVER.

In the example transaction, the application server (120) processes the request (125) and accesses a local database (130) to provide authentication and/or identification of the client (100). The application server (120) analyzes (135) the data returned from the database (130) and once determining the client may proceed with the purchase, communicates another request via a network (140) to a database server (145) to decrement inventory. The database server (145) processes the request (150), accesses its database (155) and prepares a response (160) to the application server (120). Examples of database servers include, but are not limited to those sold by Microsoft under the trademark SQL/SERVER or TRANSACTION SERVER and by IBM under the trademark DB2 SERVER.

The application server (120) receives the response (165) from the database server (145) and returns it via the network (115) to the client (100). The client then processes the response (170) to format it for display and presents the response (175) for the transaction initiator to review.

Figure 1B:
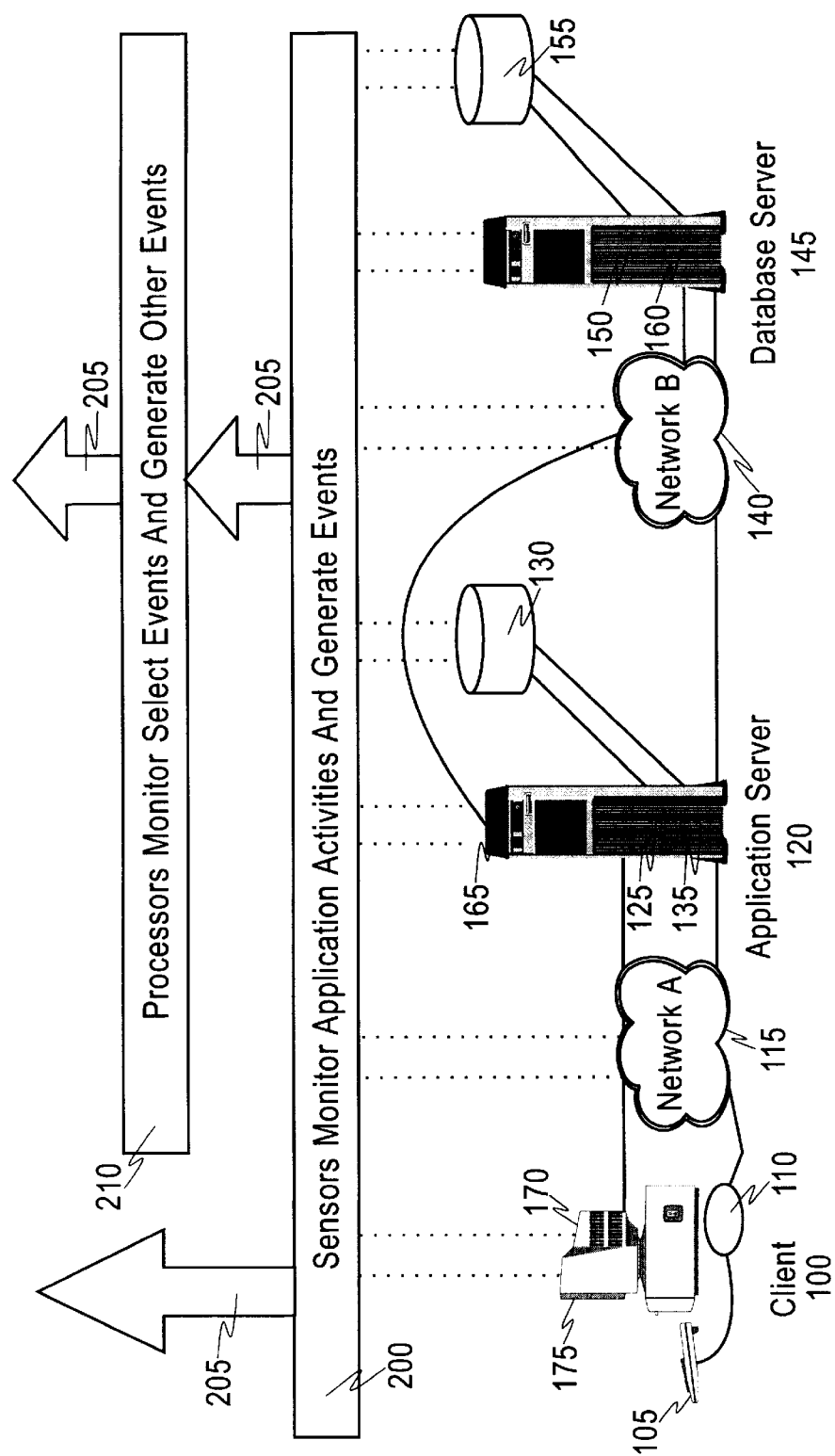
FIG. 1B depicts an example of an ETE (SLMS) Event Generation according to the present invention.

FIG. 1B depicts the system of FIG. 1A including features of the present invention for generating events (205). As depicted, sensors (200) interact with the software and hardware components through which the business transaction is processed, gleaning changes in state that result in the generation of events (205). Examples of sensors include software written to interact with software exits by registering for notification of select conditions (e.g., Lotus Notes Extension Manager); software and/or hardware written to intercept activities taken by the business transaction's software and/or hardware (e.g., interception DLL's or shared libraries, or analysis of output logs or alert messages); or insertion of software and/or hardware probes within the business transaction's software and/or hardware (e.g., ARM API calls within business transaction source code). If the change in state is such that an event can be generated, the Sensor further checks control rules (FIG. 2) e.g., filters to determine if it may generate the event. When appropriate, the sensor generates an event that describes the change in state, when and where it has occurred, and any extra data necessary to uniquely identify the event (e.g., an event describing that a file has been opened might include the name of the file as well as the file handle returned by the open activity for use in subsequent file accesses).

In addition to descriptive information about when (such as a time-stamp) and where the change in state occurred, events also include (for example via event records) any additional correlation data useful for later associating the event with other events to form transactions. Sensors (200) forward the events they generate to their Agents (FIG. 2) for temporary storage and in certain cases distribution to other system components that have registered interest in knowing that a select event has occurred. One such process is the (Event) Processor (210). The Processor (210) is used to analyze events (205) to further deduce changes in state. These changes in state may be directly related to actions occurring within the business transaction's software and/or hardware or may be derived by combining previously generated events from Sensors (200) or other Processors (210) to describe states achieved. For example, a processor could be used to describe the change in state from no databases being accessed to at least one database being accessed. Another state might indicate the end in a series of like events (e.g., the end of a transmission marked by the last send event preceding a receive event, or closure of the communications channel event). Thus, the Processor (210) can also be an event generator, using rules and controls (FIG. 2) like the Sensor, except it determines changes in state by analyzing events instead of directly monitoring activities taken by business applications or the platform components on which they run. Processors can generate events that may result from (but are not limited to) aggregations of events (e.g., start of batch of sends, end of batch of sends), or from series of events (e.g., first open, last close), or from further analysis of the correlation data within events (e.g., open of networked file vs. open of local file). Processors also forward the events they generate to their Agents (FIG. 2).

Figure 1C:
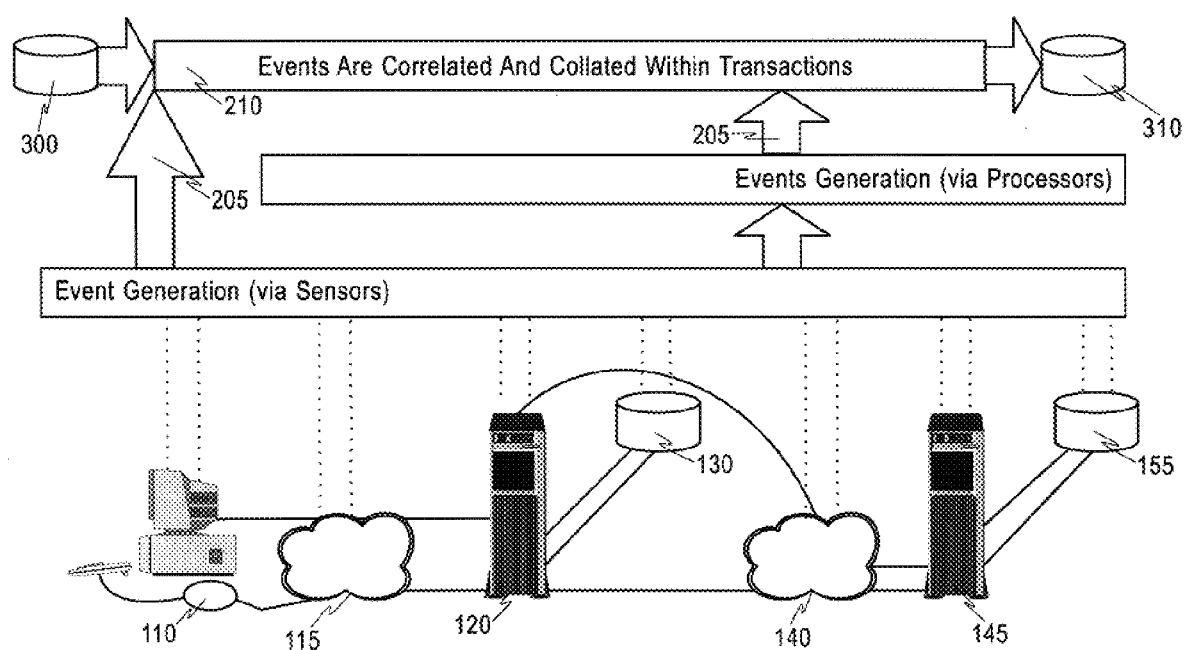
FIG. 1C depicts an example of an ETE SLMS Transaction Generation according to the present invention; having features of the present invention.
Figure 4:
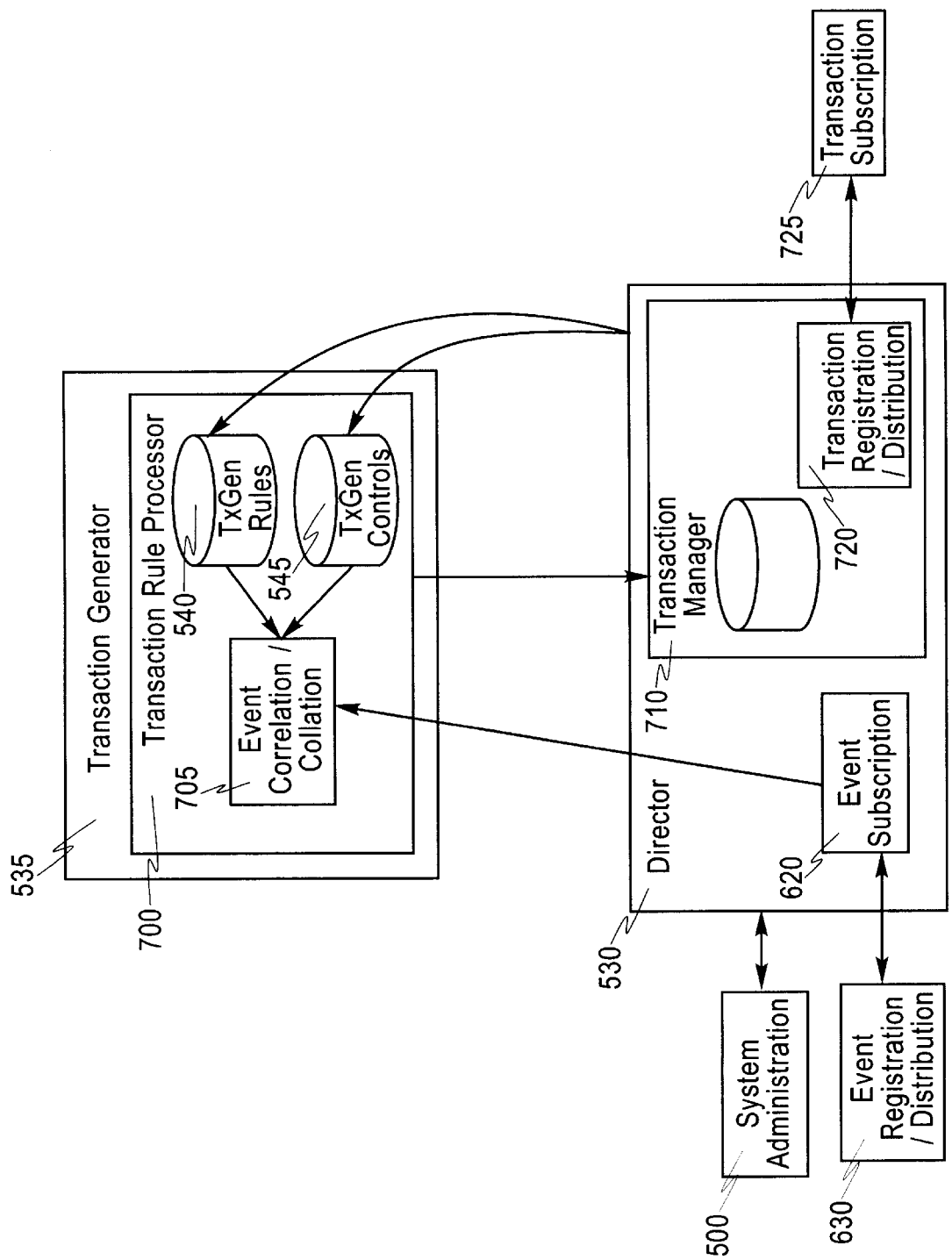
FIG. 4 depicts a more detailed example of the ETE SLMS Transaction Generation.

FIG. 1C depicts an example of the events (205) being correlated and collated with transactions (305) based on logic contained within transaction generation rules (300). An event contains a identifying information such as a time-stamp and correlation data subsequently used by the system to associate the event with other events into transactions. Correlation data can be any data deemed to be appropriate for later event correlation and collation within Transaction Records, and/or for report generation (e.g., to service selection requests for specific transaction records). Transactions are collections of related or linked events and/or other transactions. The event correlations (305) are based on common data attributes (correlation data) found within the events (205). Events can be assessed to determine if the event should begin a new transaction, and/or if the event should be incorporated within an existing "work-in-progress" transaction. It is a major advantage of the present invention to perform the correlation and collation of events in a dynamic fashion, dictated by flexibly defined transaction generation rules (300) that can be created and/or changed. Preferably, the rules originate in a high-level software language format that is later converted into a binary format capable of being interpreted by a transaction generator (FIG. 4). Transaction definition and transaction rule generation will be discussed in more detail with reference to FIG. 8. Based on the transaction generation rules, and the arrival of events, when a transaction is completed (e.g., no longer a "work-in-progress") it can be temporarily stored pending distribution to other system components that have registered an interest in knowing when select transactions have been generated.

Figure 1D:
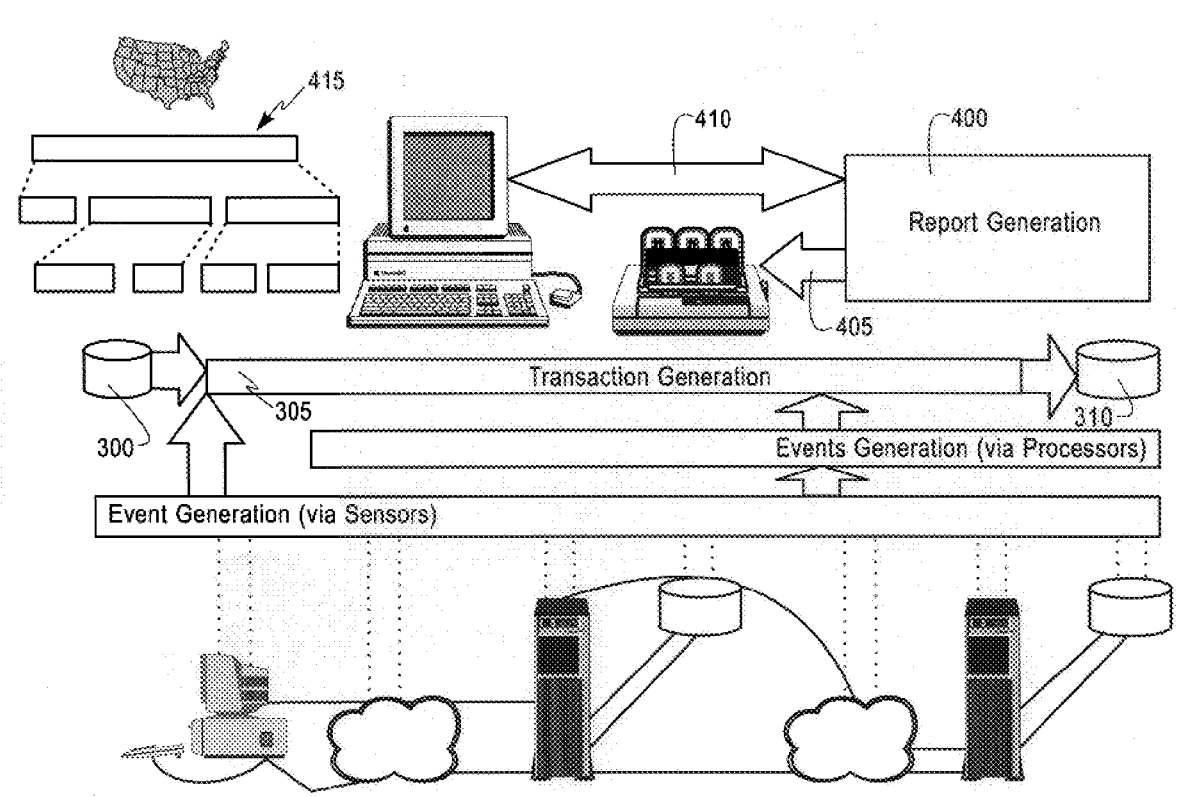
FIG. 1D depicts an example of an ETE SLMS Report Generation according to the present invention.

FIG. 1D depicts an example of Report Generation (400) facilities having features of the present invention. By way of overview, Report Generation (400) involves the retrieval and manipulation of transactions to glean information relating to availability and performance of business transactions. Just as event and transaction generation preferably uses rules and controls in the creation of their output, so do the Report Generation facilities. Generation of reports includes definition of the initial selection and processing of transactions, as well as the sorting and aggregation methods used to consolidate the transactions' event data into availability and performance information. As depicted, the Report Generation (400) facilities can retrieve transactions from a transaction store (310) and present them in both printed (405) and interactive (410) formats. The report generation facilities enable transactions to be viewed (415) as graphical aggregates or in detailed decomposition's showing the contribution of select stages of processing the business transaction has undergone. An example of a browser response time and decomposition will be described with reference to FIG. 14.

Figure 2:
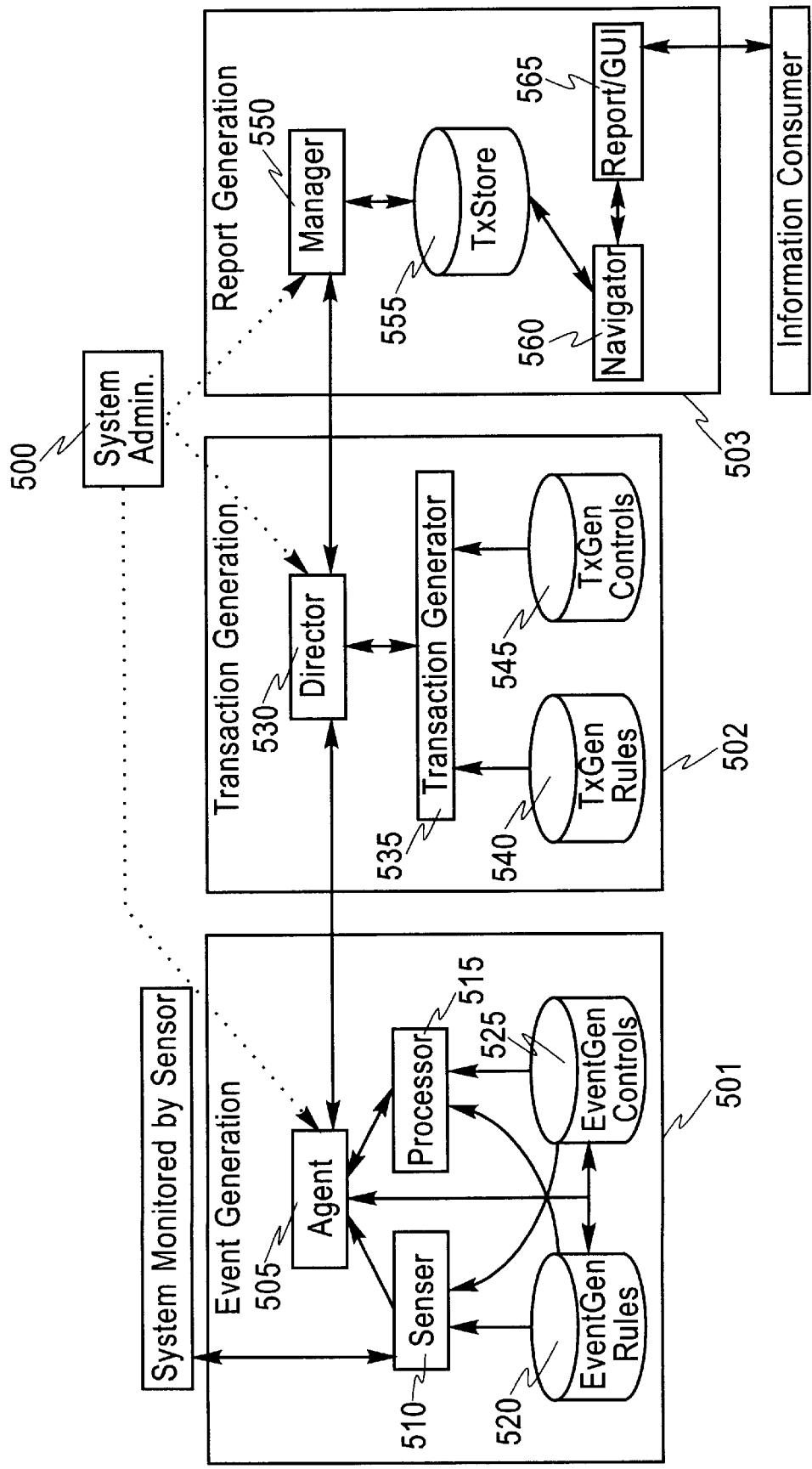
FIG. 2 depicts an example of an ETE SLMS System Overview according to the present invention.

FIG. 2 depicts an example of a system overview in accordance with the present invention. As depicted, the system includes three logical components: Event Generation (501); Transaction Generation (502); and Report Generation (503). In the most general view the invention monitors a System (e.g., application) using sensors (510) and provides a Report/GUI (565) to the Information Consumer. The communication among the components can be done in the following way. The Agent (505) in the Event Generation (501) component communicates with the Director (530) in the Transaction Generation (502) component and the Director (530) communicates with the Manager (550) in the Report Generation (503) component. The Agent, the Director and the Manager are preferably controlled by the System Administrator (500). The Event Generation (501) component preferably exists on every computer being measured, with one Agent (505) per computer. There can be multiple Sensors (510) and Processors (515) in a computer. The Sensor (510) monitors and records events according to EventGenRules (520) and EventGenControls (525). The Sensor sends the events to the Agent (505). Using EventGenRules and EventGenControls the Agent (505) determines whether to send the event to the Processor (515).

The Processor (515) uses EventGenRules (520) and EventGenControls (525) to form new events from forwarded events. The Processor (515) then sends those new events to the Agent (505). Preferably, the communication between the Sensor (510) and the Agent (505) and between the Processor (515) and the Agent (505) is done by means of inter process communication (IPC) in main memory. IPC is well known to those of skill in the art and refers to the ability in a multitasking OS, of one task or process to exchange data with another. Examples of common IPC methods include pipes, semaphores, shared memory, queues, and signals.

The Director (530) collects events from the Agent (505). The Transaction Generation (502) logic can exist in every monitored computer but typically it exists in one computer in a LAN. The Director (530) receives events from the Agents (505) under his control (the Director can for example have a list of his Agents). The Transaction Generator (535) examines the events collected by the Director. Transaction Generator (535) uses the TxGenControls (545) and TxGenRules (540) to produce transactions which are often made of previously generated subtransactions.

The System Administrator (500) determines (controls) what transactions to generate. The System Administrator (500) also determines what events are generated at the Agent (505). The System Administrator can also determine the events that are needed by Transaction Generator (535) to produce the transactions of interest and limit the events collected at the Agent(s) (505) to just those necessary for these transactions.

The Manager (550) collects the transactions from the Director (530). There can be multiple Directors the Manager collects from. The Manager stores the transactions in TxStore (555). Upon a specific or periodic request a from GUI (565), a report or continuous graphical monitoring can be produced for the Information Consumer. The Report/GUI (565) function relies on the Navigator (560) to find the necessary transactions in TxStore (555).

Figure 3:
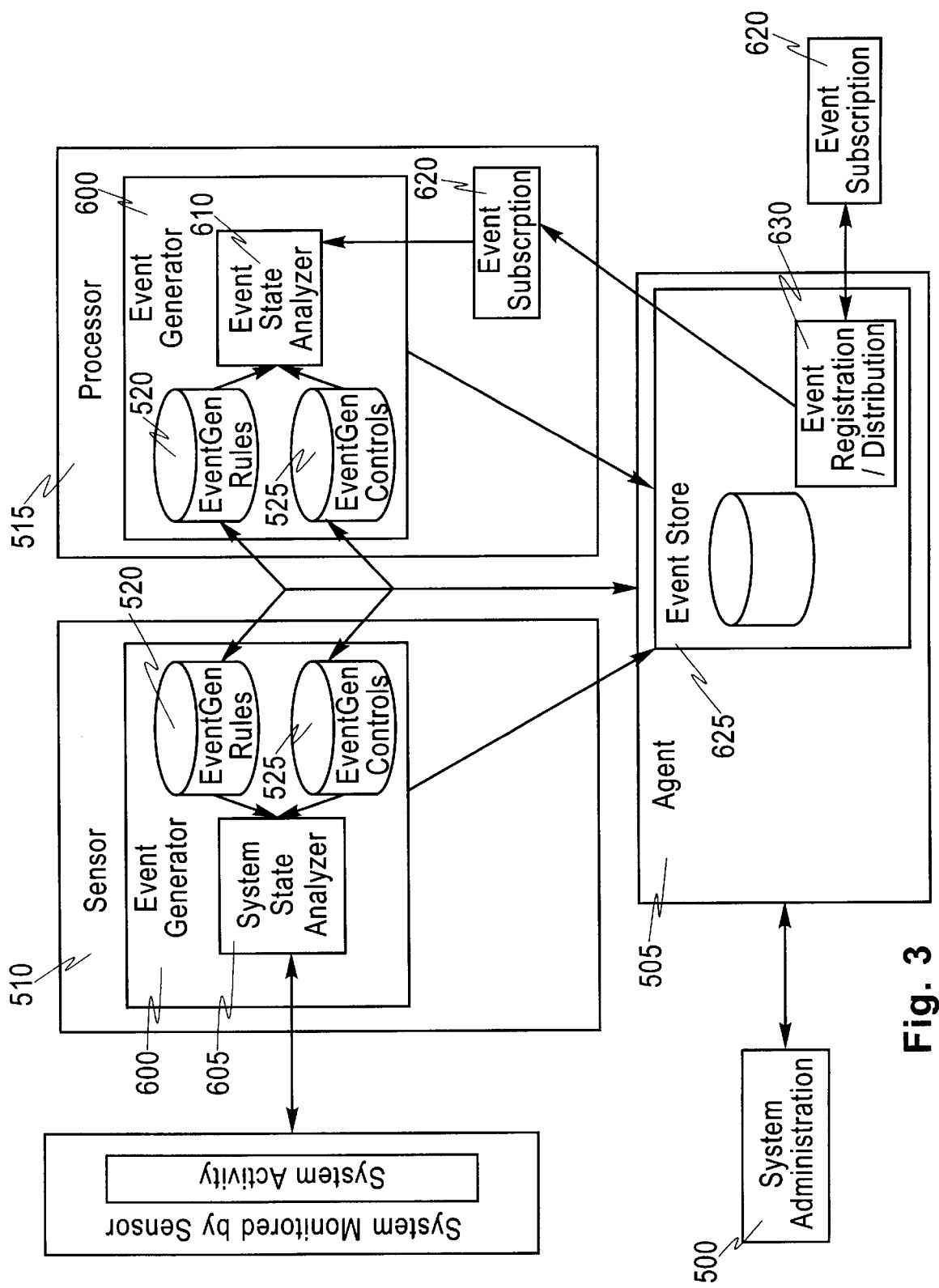
FIG. 3 depicts a more detailed example of the ETE SLMS Event Generation.

FIG. 3 depicts a more detailed example of the Event Generation logic of FIG. 2. As depicted, the Sensor (510) monitors a System Activity by means of a System State Analyzer (605). Whenever the System State Analyzer (605) detects a change in state, the Event Generator (600) may generate an event based on EventGenRules (520) and EvenGenControls (525). This event is sent to Event Store (625) which is part of the Agent (505). The Event Store (625) includes an Event Registration/Distribution (630) function. Any authorized function can register for events of interest (subscribe) and receive a copy of those Agent events. The registered function can be either remote (on a different computer) or local. An example of a local function that is registered for the Event Store (625) is the Processor (515) that has an Event Subscription (620). The Event State Analyzer (610) examines the events. Whenever a change in event state occurs, the Event Generator (600) can produce a new event based on the EventGenRules (520) and the EventGenControls (525). The event is sent to the Event Store. The System Administrator (500) controls the event generation process (determining what events to generate, supplying the EventGenRules, etc.).

FIG. 4 depicts a more detailed example of the Transaction Generation logic of FIG. 2. The events are communicated to the Director (530) from the Agents by means of the Event Registration/Distribution mechanism (630). The Director (530) subscribes to events he needs from Agents using the Event Subscription (620) functionality. The Transaction Rule Processor (700) processes the events. The Event Correlation/Collation (705) functionality uses TxGenRules (540) and TxGenControls (545) to process the events. Transactions generated by the Transaction Generator (535) are sent to the Transaction Manager (710) in the Director (530). The transactions can be stored and a copy of some of those transactions sent out using the Transaction Registration/Distribution (720) function. The registration for receiving transactions can be done by means of the Transaction Subscription (725). The System Administrator (500) controls Transaction Generation by determining what transactions to generate, supplying the TxGenRules, etc.

Figure 5:
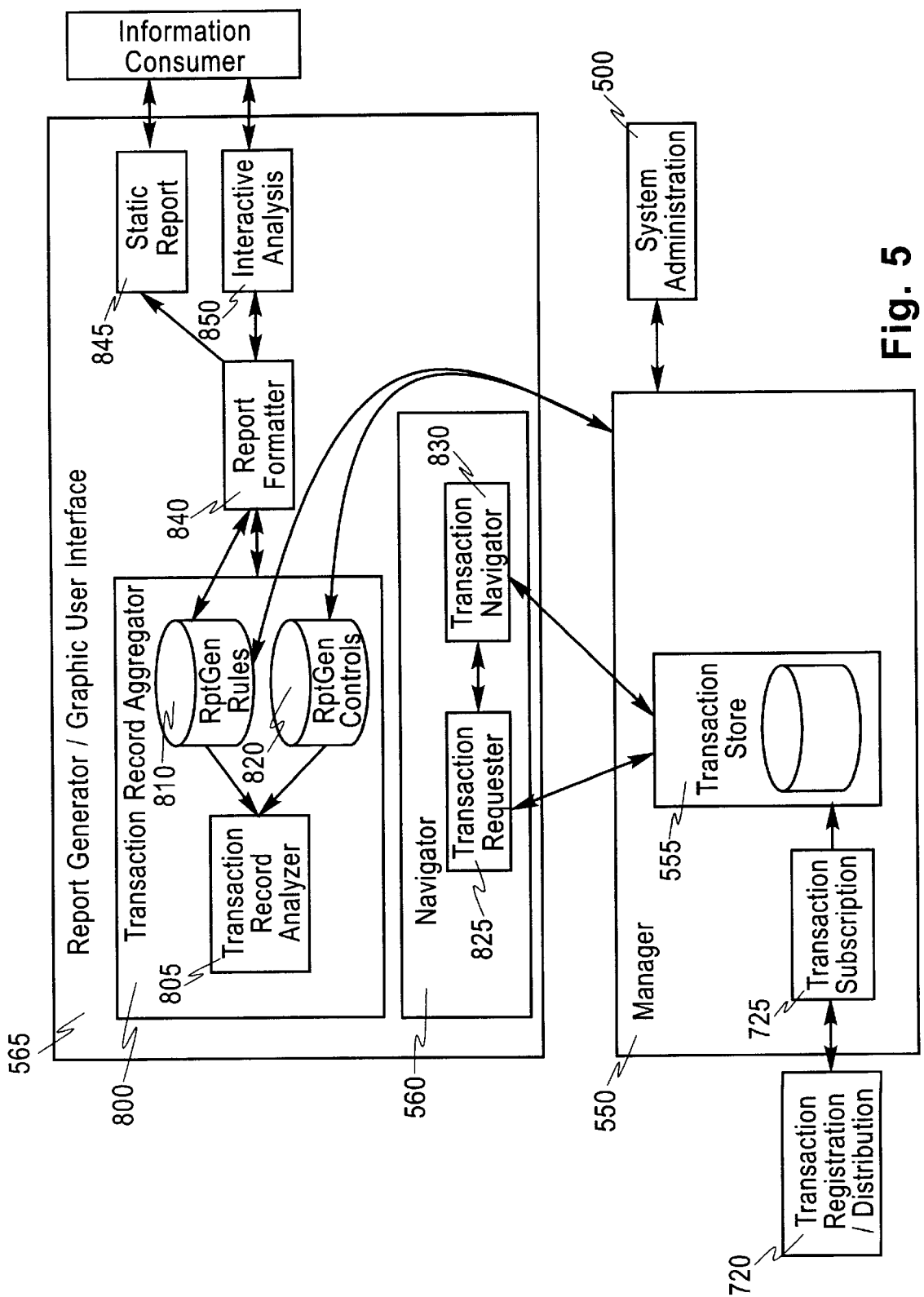
FIG. 5 depicts a more detailed example of the ETE SLMS Report Generation.

FIG. 5 depicts a more detailed example of the Report Generation logic of FIG. 2. As depicted, the Manager (550) uses the Transaction Subscription (725) to subscribe to receive transactions from Directors (530). The Transaction Subscription (725) contacts the Transaction Registration/Distribution (720) to start receiving transactions. The transactions that are sent to the Manager (550) are stored in Transaction Store (555). The Information Consumer can request and receive a Static Report (845) or perform an Interactive Analysis (850). Those two forms of user interaction rely on a Report Formatter (840). The Report Formatter interacts with the Transaction Record Aggregator (800). For example, Transaction Record Aggregator can summarize individual transaction records into aggregate records, e.g. average, distributions. An Aggregator can be scheduled or run as a batch job. Report Formatter can call for certain types of aggregation or reference existing transactions. Report Formatter controls the interpretation and presentation of transaction information, e.g. duration and decomposition. The Transaction Record Analyzer (805) requests and receives transactions from the Navigator (560) and combines those transactions into reports by using the RptGenRules (810) and the RptGenControls (820). The Navigator acquires transactions by retrieving transactions directly from Transaction Store (555) by using the Transaction Requestor (825) or by requesting the Transaction Navigator (830) to find those for him in the Transaction Store. The System Administration (500) controls Report Generation by supplying RptGenRules, RepGenControls, etc.

Figure 6:
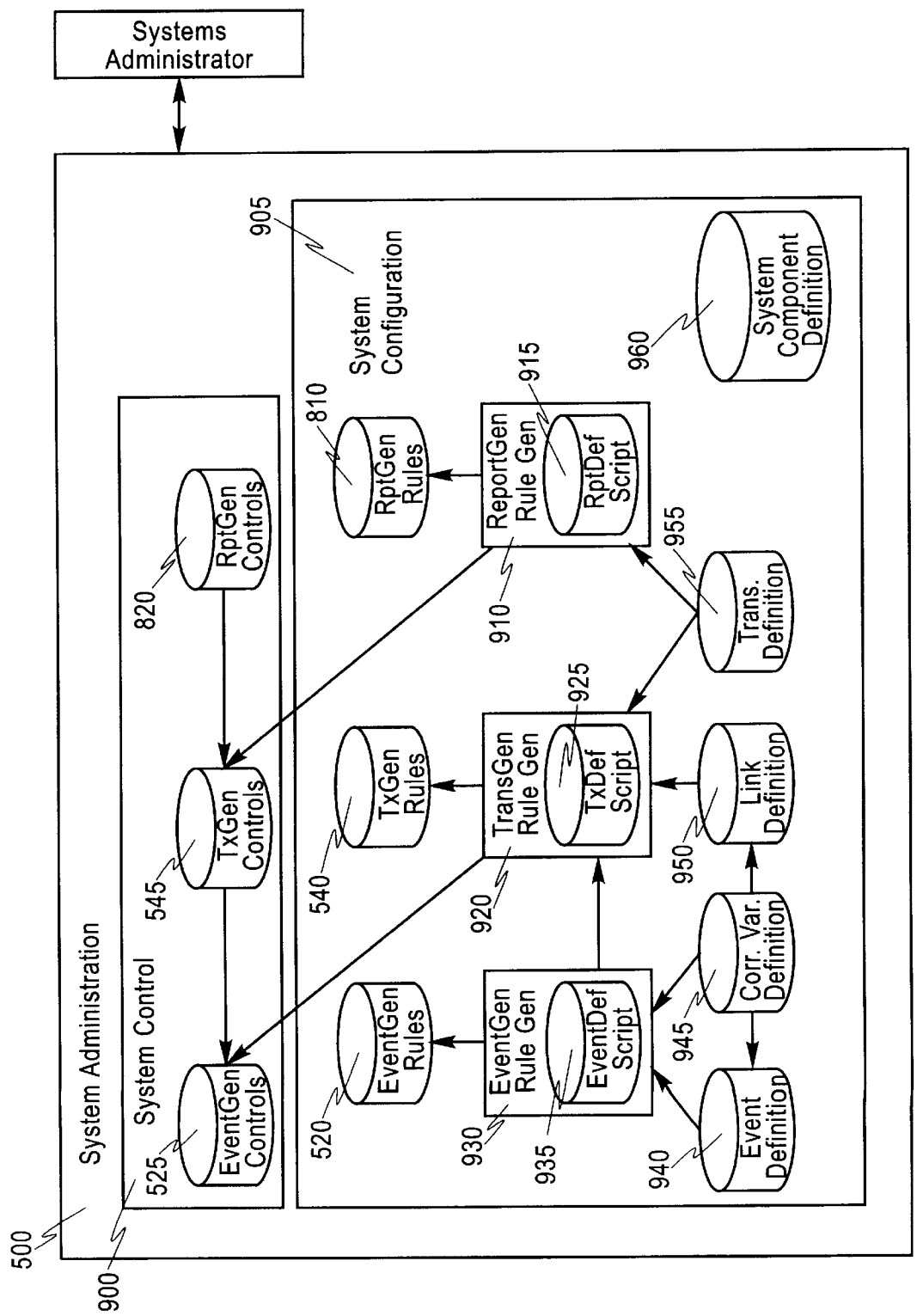
FIG. 6 depicts a more detailed example of the ETE SLMS Administration.

FIG. 6 describes a more detailed example of the System Administration logic of FIG. 2. As depicted, the System Administration (500) includes of a System Control (900) component and System Configuration (905) compnent. the System Control (900) provides the EventGenControls (525), TxGenControls (545) and RptGenControls (820) (whose function was described in FIGS. 3, 4 and 5). Among other functions the EventGenControls (525) enable the dynamic activation of additional events by a sensor and/or the deactivation of events by a sensor. The System Configuration (905) supplies the EventGenRules (520), the TxGenRules (540) and RptGenRules (810) (whose function was described in FIGS. 3, 4, and 5). The EventGenRules (520) are produced by EventGen/Rule/Gen (930) and rely on a EventDef Script (935) and on a Event Definition (940) as well as a CorrelationVariable Definition (945). The Event Definition (940) relies on the Correlation Variable Definition (945). The TxGen Rules (540) are produced by TransGen/ Rule Gen (920) and rely the on TxDef Script (925) as well as the Link Definition (950) and Transaction Definition (955). The Link Definition (950) relies on the Correlation Variable Definition (945). The RptGen Rules (81)) are produced by ReportGen/Rule Gen and rely on the RptDef Script (915) as well as the Trans. Definition (955). Note that the TxGenControls (545) are built from RptGenControls (820) and from ReportGen/Rule Gen (910). Also note that EventGenControls (525) are built from TxGenControls (545) and TransGen/Rule Gen (920).

Figure 7:
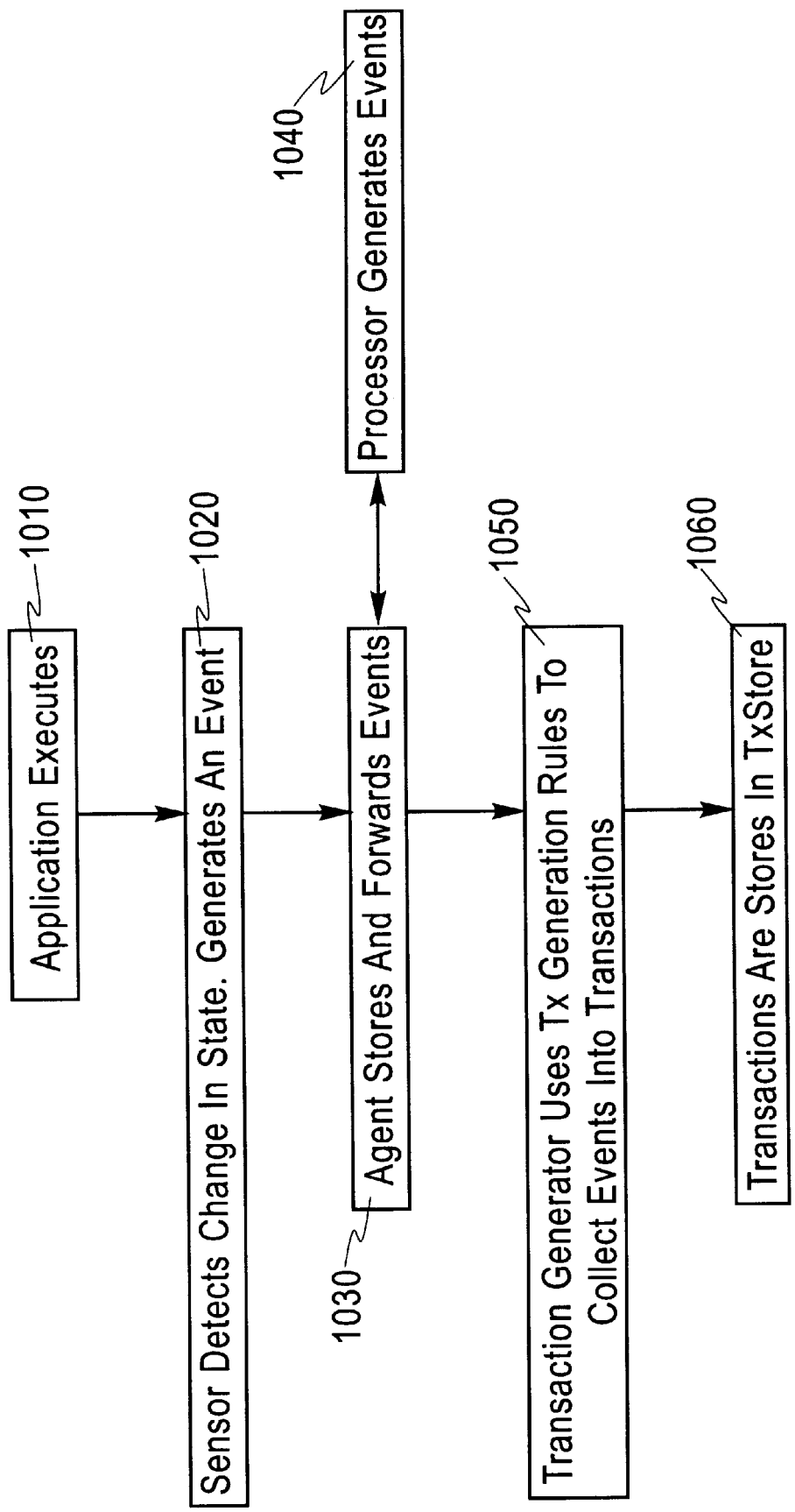
FIG. 7 depicts an example of describes the flow of execution from sensing change in the application until transactions are placed in the Transaction Store.

FIG. 7 describes an example of a flow of execution from the sensing of a change in state of an application until transactions are placed in the Transaction Store. As depicted, in step 1010, while the application executes, a Sensor (510) detects change in state and generates an event, in step 1020. The Agent (505) receives the event, stores it and sometimes forwards the event (1030) to the Processor (515). The Processor may generate additional events and sends them to the Agent (505), in step 1040. The events subscribed to by the Transaction Generator (535) are received by it. The Transaction Generator uses the Transaction Generation Rules (54) to collect events into transactions, in step 1050. The Transaction Generator (535) then forwards the transaction to Transaction Store (555), in step 1060.

Figure 8:
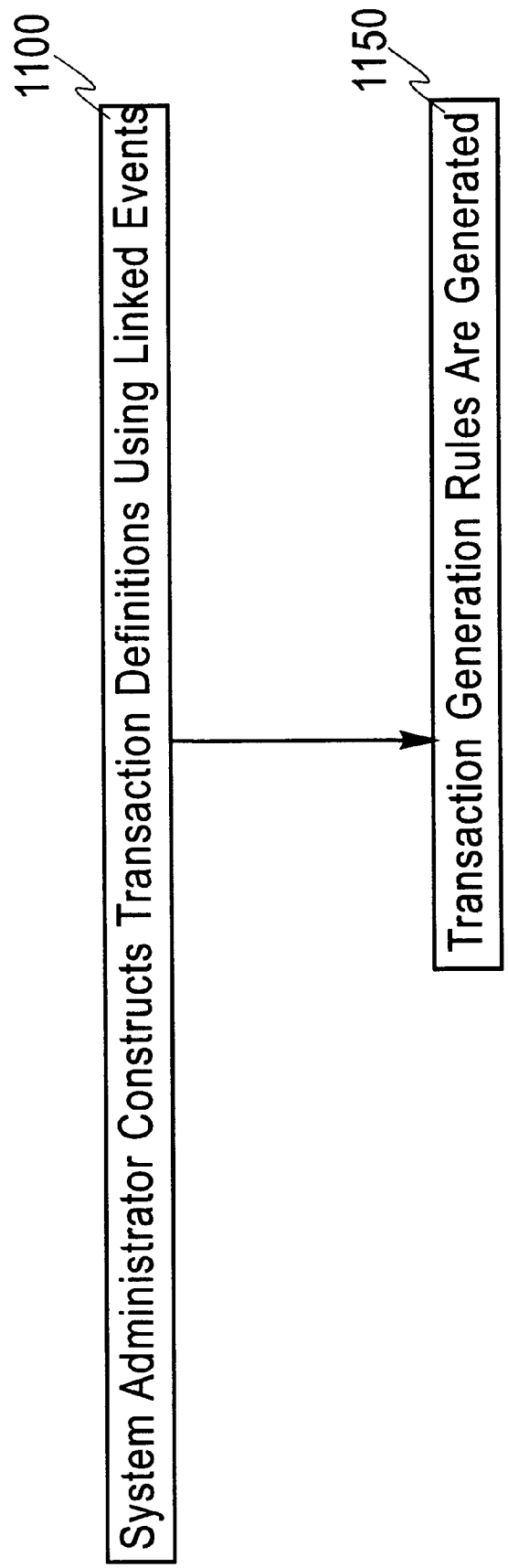
FIG. 8 depicts an example of the flow of execution from a transaction definition until this definition is converted to a set of rules that can be used by the Transaction Generator.

FIG. 8 describes an example of a flow of execution from a transaction definition until this definition is converted to a set of rules that can be used by the Transaction Generator (535). According to the present invention, transactions can be defined by a language called the ETE Transaction Definition Language. This language specifies how to construct a transaction from events and links. The links connect one event to another (see FIGS. 10, 11, 12 following). As depicted, in step 1 100, the System Administrator constructs a transaction definition using linked events. In step 11 50, once the transaction is defined by using the language it can be translated by means of a program, similar to a parser, into a set tables called the transaction generation rules (540).

The following is an example of a transaction definition. Here we will explain the transaction definition. Familiarity with FIGS. 8, 9, 11, 12, 13 is desirable to follow this explanation. This example will also be referenced in the description of FIG. 14. Note that events are denoted by (Exy); links are denoted by (Lqr); and transaction are denoted by (Tde).

Example Web Commerce Transaction Definition:

```
Start --> TxWebClientGetPage (T1) --> Link_MID_PID (L2)
WinsockFirstSocketOpenStart (E33)
[Link_MID_PID_TID (L3) TxWinsockGetHostByName (T12)]           // Local
{[Link_MID_PID (L2) TxWebClientConnect (T2)]}                   // Local, recursive
WinsockAllSocketsClosedComplete (E20)
T2=TxWebClientConnect --> Link_MID_PID_SocketID (L4)
WinsockConnectStart (E17)
WinsockConnectComplete (E18)
[Link_Client_IP_Port (L5) TxServerAccept (T3)]                  // Remote (no MID)
WinsockURLGetComplete (E66)
[Link_URL_CGI TxWebCGI (T4)]                                    // Remote (no MID)
CloseSocketComplete (E32)
T4=TxWebCGI --> Link_MID_ARM_Tx (L7)
ARMLinkComplete (E58)
ARMStopComplete (E44)
T12=TxWinsockGetHostByName --> Link_MID_PID_TID (L3)
WinsockGetHostByNameStart (E21)
WinsockGetHostByNameComplete (E22)
Start --> T3=TxServerAccept (T3) --> Link_MID_PID_SocketID (L4)
WinsockAcceptComplete (E30)
WinsockCloseSocketComplete (E32)
```

Web Commerce Transaction Explanation:

The event starting the transaction TxWebClientGetPage is WinsockFirstSocketOpenStart (event E33). The last event in the transaction is E20. Those two events are linked by LINK_MID_PID. LINK_MID_PID refers to the machine id (MD) and the process id (PID) of events E33 and E20. When the values in the (MID) and (PID) fields in those two events (E33 and E20) are identical, then those two events are "linked." Note that a link is written here before the two events it links. In this example definition, between events E33 and E20, two additional subtransactions can occur. One transaction, T12 can occur once (indicated by square brackets). The other transaction T2 can occur from zero to many times (indicated by {[ ]}). Those two subtransactions are defined as the fourth and the second subtransactions above. Subtransaction T2 in turn is defined in terms of two additional subtransactions: TxWebCGI (T4) and TxServerAccept (T3). The first event of subtransaction T12 is linked to the previous event by means of LINK_MID_PID_TID (L3). The TID refers to a thread id. Note that the first event of subtransaction T12 is event E21. Thus if event E33 in transaction T1 is followed by E20 with a matching LINK_MID_PID, then the transaction is complete. However if event E33 is followed by events E21 and E22 (see subtransaction T12) with a matching LINK_MID_PID_TID and E33 and E21 have a matching LINK_MID_PID_TID then we probably have a T12 subtransaction in the T1 transaction. The first event of T2 is linked to the previous event by means of LINK_MID_PID (L2) and the parsing is done similarly.

Figure 9:
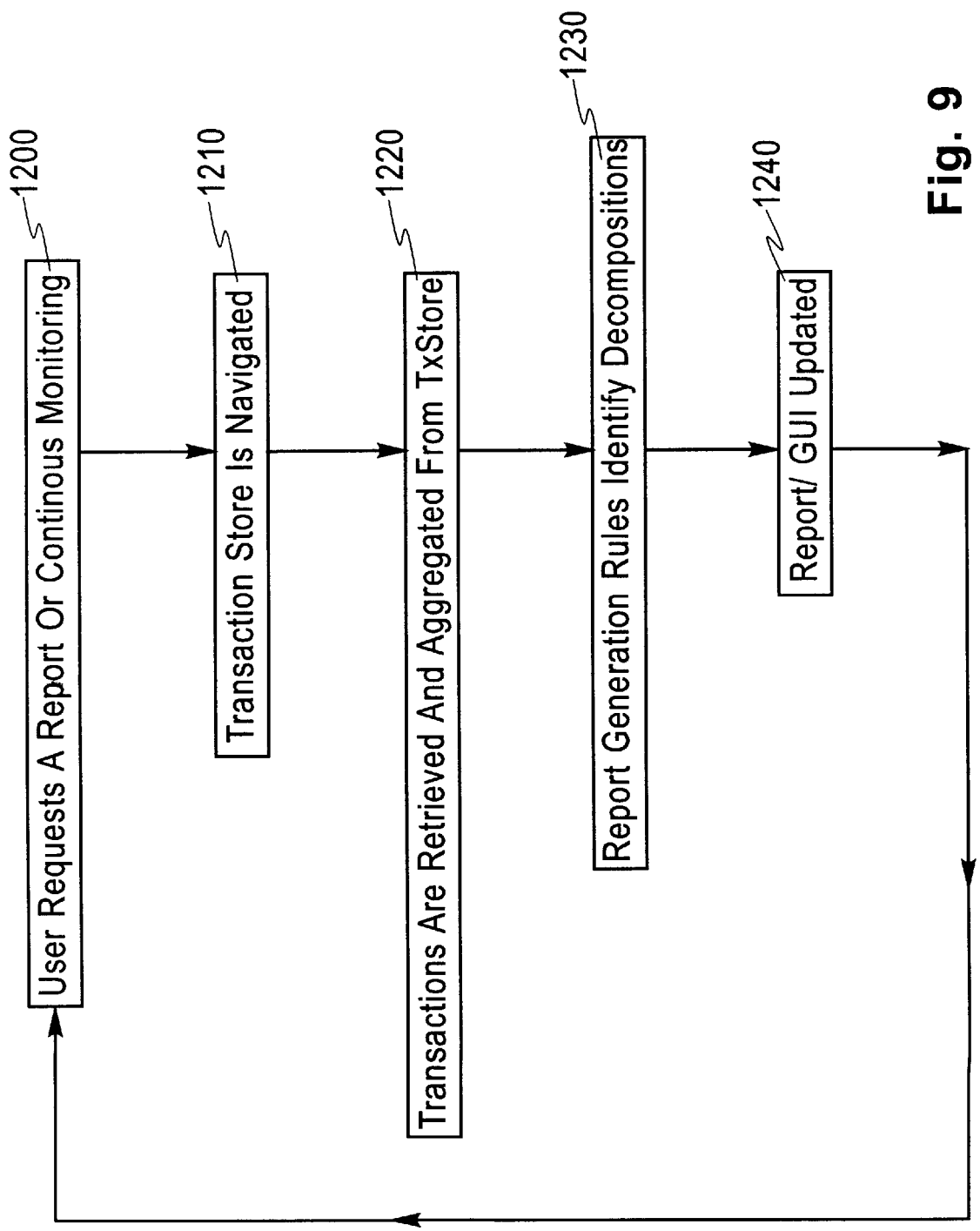
FIG. 9 depicts an example of the flow of execution from user's request for a report or continuous monitoring until this request is satisfied.

FIG. 9 depicts an example of a flow of execution from a user's request for a report or continuous monitoring until this request is satisfied. As depicted, in step 1200, a user requests a report or continuous monitoring. In step 1210, the Transaction Store (555) is navigated. In step 1220, transactions are retrieved from the Transaction Store (555) and aggregated. In step 1230, Report generation rules (810) identify how to process those transactions. Finally, in step 1240, the report is produced or the GUI is updated.

Figure 10:
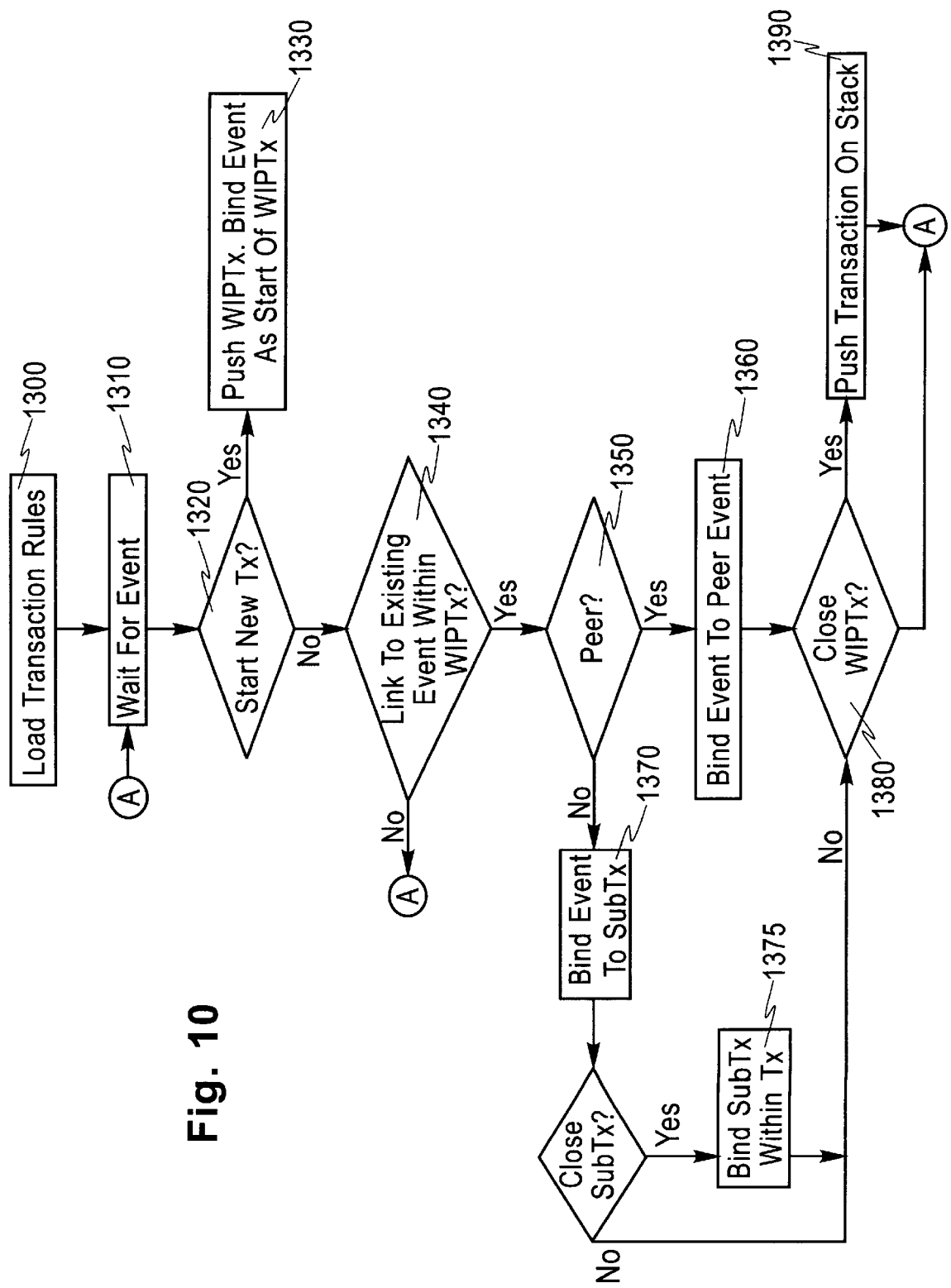
FIG. 10 depicts an example of the flow of execution during a Transaction Generation.

FIG. 10 depicts an example of a flow of execution during Transaction Generation. The algorithm is similar to parsing. The example browser response time and decomposition will also refer back to this execution flow. As discussed with reference to FIG. 8, the Transaction Generation rules (540) are preferably tables that are used as an input to the Transaction Generator (535). In step 1300, the Transaction Generation rules (540) are loaded by the Generator as it starts. In step 1310, the Generator waits for events. When an event arrives, in step 1320, the Generator (535) examines the Transaction Generation Rules (see FIG. 8 description for an example of those rules in language form) to determine whether the event is a starting event, i.e., a new transaction. If it is, the new Transaction is then pushed into a WIP (Work In Progress) list of Transactions and the event is indicated as a starting event in this Transaction, in step 1330. If it not a starting event in a transaction, then it is examined to determine whether it can be linked to an event in a WIP Transaction (WIPTx), in step 1340. If it can not, the process returns to wait for an event, in step 1310. If the event can be linked to an event in a WIP Transaction, in step 1350 it is determined whether the event is linked as a peer in this Transaction. If it is a peer, in step 1360 it is bound (linked) to the prior event in the WIPTx. The event is then examined to see whether it completes the WIPTx, in step 1380. If the transactions complete, in step 1390, the completed transaction is pushed on the stack and the process again returns to step 1310 to wait for an event. If the event does not complete the transaction the process again returns to step 1310 to wait for an event. If, in step 1350 it is determined that the event is not a peer, it is bound to an event in a WIP subtransaction, in step 1370. If this event completes the subtransaction, the subtransaction is bound to the transaction, in step 1375. Then process continues at step 1380.

Figure 11:
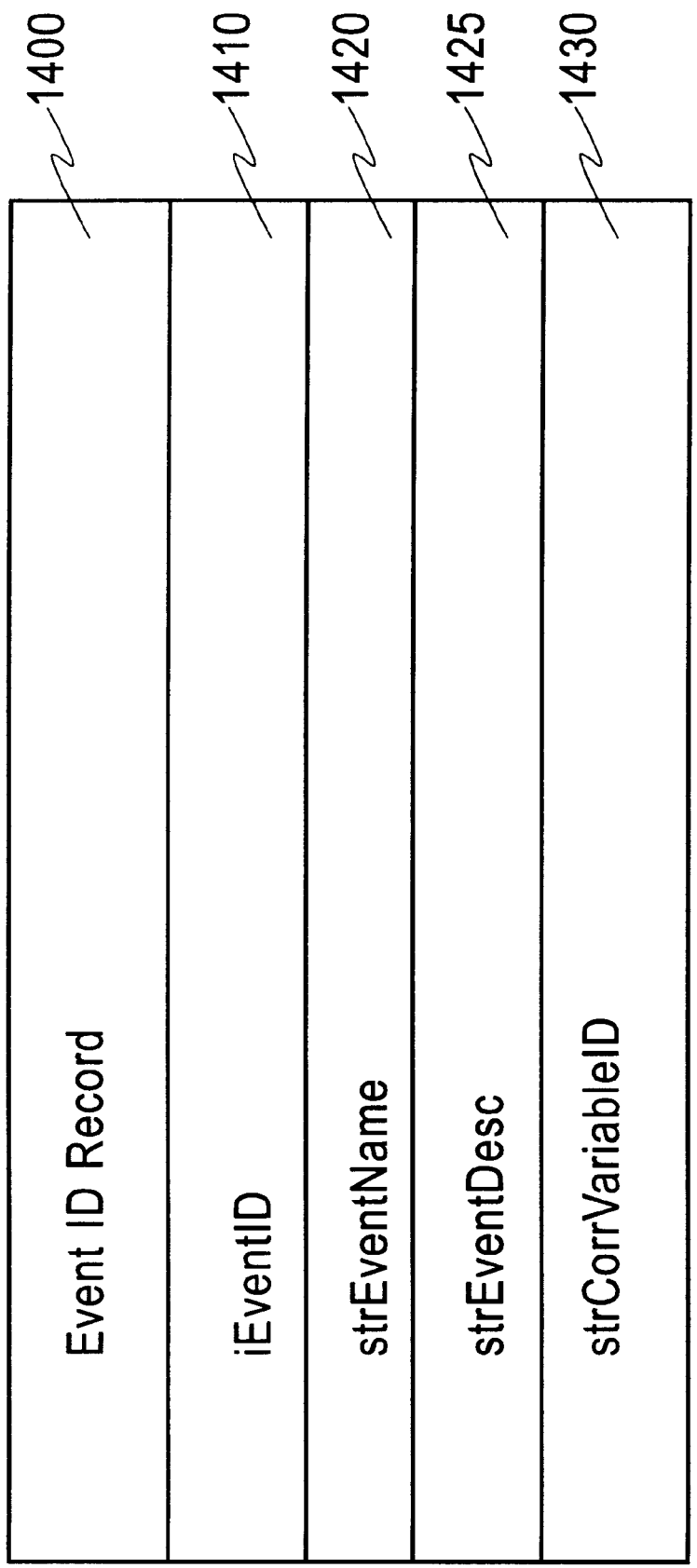
FIG. 11 depicts an example of an Event Id Record.

FIG. 11 depicts an example of an event record (1400). The event record includes three fields: iEventID (1410) identifies an event; strEventName (1420) provides the name of the event; and strCorrVariable (1430) is a Correlation Variable Definition Vector. Each entry in the Correlation Variable Definition Vector is a Correlation Variable ID (1510). The process of correlation uses the Correlation Variable Definition Vector. When a transaction definition (see FIG. 8 description for an example) states that two events can be linked to each other it specifies a LINK. The LINK will indicate the correlation variables that can link the events. The transaction generator will confirm that the two events indeed share the correlation variables indicated by the LINK and if the correlation data identified by the values of those two variables are identical, it will LINK those two events.

Figure 12:
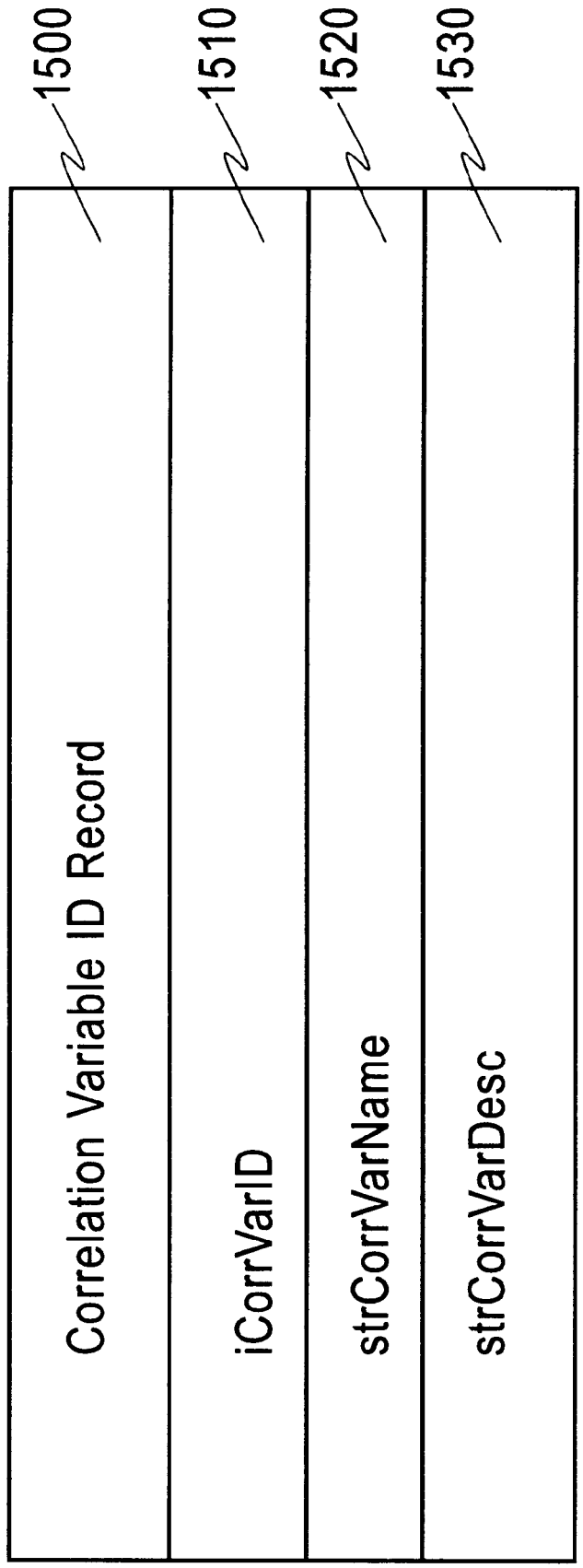
FIG. 12 depicts an example of a Correlation Variable ID Record.

FIG. 12 depicts an example of a Correlation Variable ID Record (1500). This record is used to translate from a VarName to VarD. The record includes three fields: iCorrVarID (1510) is the ID of the correlation variable; strCorrVarName (1520) is the name of the correlation variable; and strCorrVarDesc (1530) is a description of the correlation variable.

Figure 13:
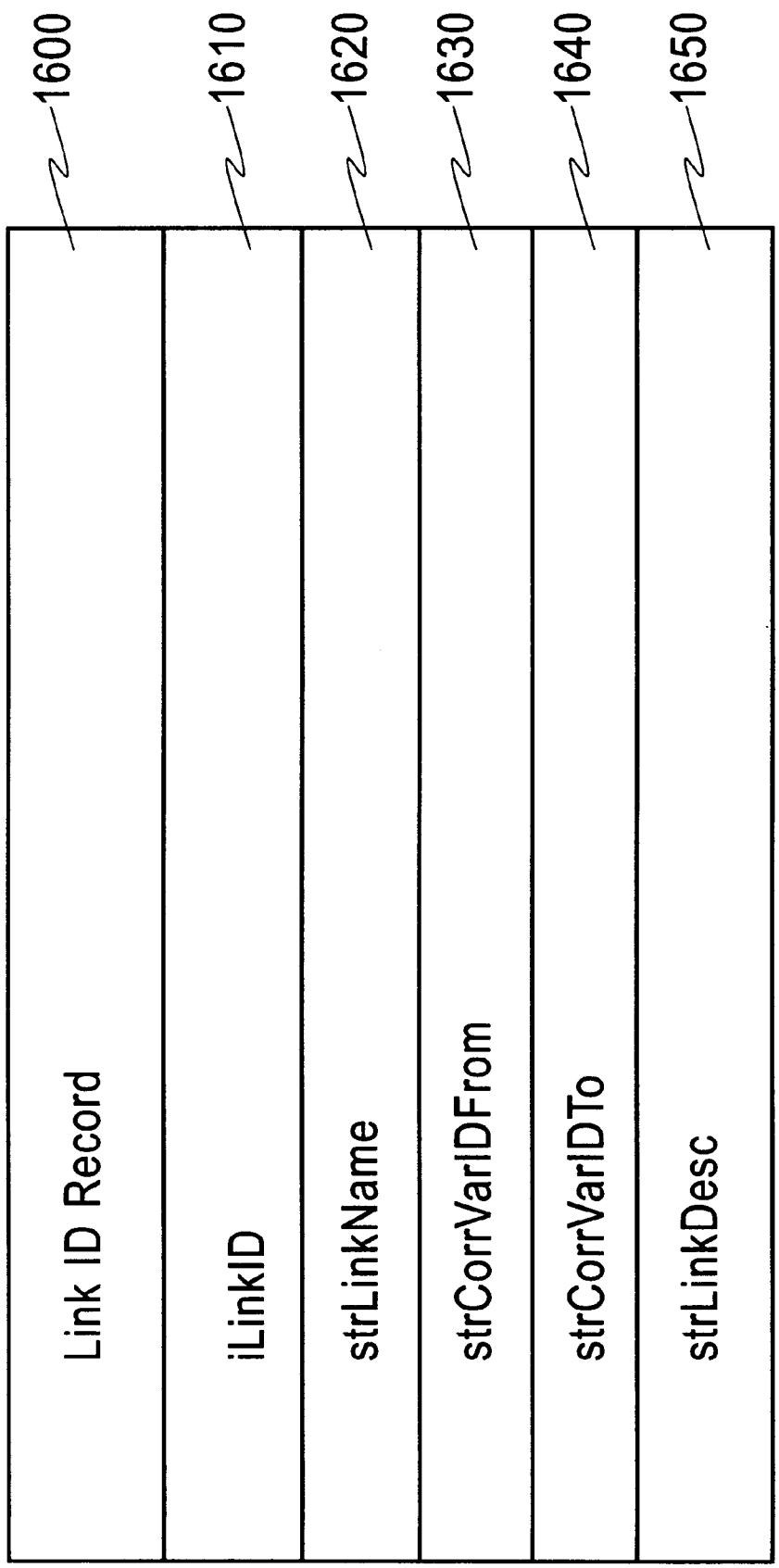
FIG. 13 depicts an example of Link ID Records.

FIG. 13 depicts an example of a LINK ID Record (1600). This record is used to correlate events. The from event and the to event correlation variables are described in this record. It includes five fields: LinkID (1610) identifies the link; strLinkName (1620) gives the name of the link; strCorrVarIDFrom 1630) lists all the correlation variables in the "from event" (this is a "from" Corr Variable ID list); strCorrVarIDTO (1640) lists all the correlation variables in the "to event" (This a "to" Corr Variable ID list); and strLinkDesc is a description of the link (1650). There is a one to one correspondence between every entry in the "from" list to every entry in the "to" list.

Figure 14:
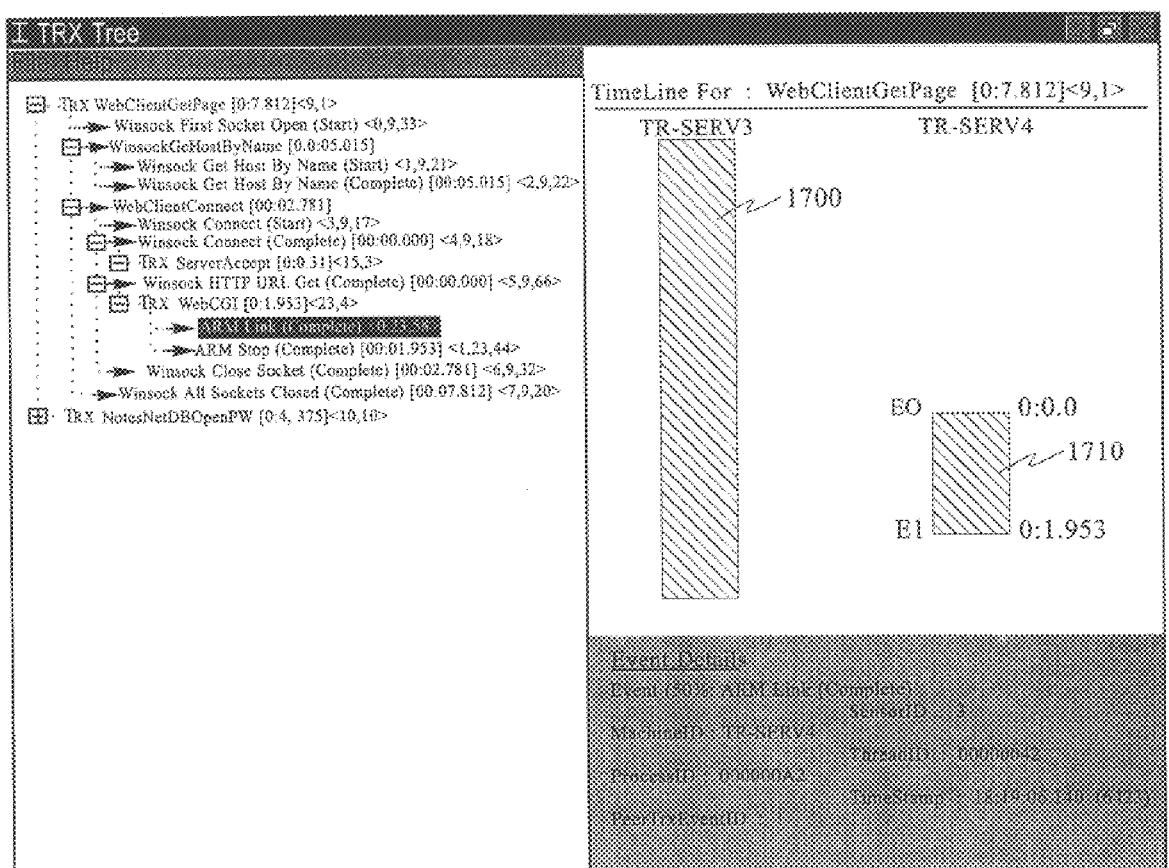
FIG. 14 depicts an example of a Browser Response Time and Decomposition.

FIG. 14 depicts an example sequence of events encountered during Transaction Generation (FIG. 10) of the Web Commerce transaction (FIG. 8). The left part of FIG. 14 describes Transaction Generation from the arriving events. The right side of FIG. 14 depicts the duration of TI (bar on the left, 1700) and the duration of T4-WebCGI (bar on the right, 1710) that takes place on the server machine. The left bar is an approximation of total response time and the right bar is the server component of this response time. The network component of response time can be derived by subtraction. Note that only entries which have no children represent events. Entries having children represent transactions. The order of arrival of events is top down. As depicted, a first event (13 10) "FirstSocketOpen (Start)" matches transaction T1 rules (1320). The next event "by Name (Start)" links using LINK_MID_PID_TID in transaction T1 (1340, 1360). It is followed by "by Name (complete)" (1340) to form the subtransaction "HostByName" using transaction definition T12 (1370, 1375). The next event "Connect (Start)" links to "FirstSocketOpen (Start)" by LINK_MID_PID (T2) (1340, 1360).

It is then followed by "Connect (Complete)" which is peer linked to "Connect (Start) using the T2 definition (1370). The unexpanded transaction "ServerAccept" includes two events (see T3). The first event in transaction Server Accept (T3) (1320, 1330) links by Link_Client_IP_Port (L5) to "Connect (Complete)" (E18) (1340, 1360). The two unexpanded events in T3: "Winsock Accept Complete" and "Winsock Close Socket Complete" are generated on the server (1340, 1360). The next event "HTTP URL Get" (E66) is part of T2 (1340, 1360). It is followed by "ARM Link" (1320, 1330) and "ARM Stop" (1340, 1360, 1375) generated on the server. Those form the "WebCGI" subtransaction (T4) as part of T2. The next event "Close Socket (Complete)" is the completing event in T2 (1375). T2 is now formed. The "All Sockets Closed (Complete)" event (E20) completes T1 (1340, 1360, 1390).

FIG. 15 depicts examples of ETE APIs. The table includes base APIs that can generate, send, and request receipt of Events as well as APIs used by the Sensor (510) to establish communications with the Agent (505). Those skilled in the art will appreciate that the APIs can use one or more parameters (not shown) to identify characteristics (specified in the Functional Description) used by the API. Specifically, a start(parameters) API activates a specified Sensor (510) and establishes communications with the Agent (505). The makeEvent(parameters) API causes the Event Generator (501) to create an event of a specified type with specified attributes. The AddCorrVar(parameters) API appends specified Correlation Variable data to a specified event. The sendEvent(parameters) API sends a specified event to the Agent (505). The deleteEvent(parameters) API deletes resources allocated to a specified event. The stop (parameters) API inactivates the Sensors and stops communications with the Agent. The is Active(parameters) API queries the state of the Sensor, for example whether it is active (started) or inactive. The requestEvent(parameters) API solicits or cancels receipt of specified events from a specified supplier.

Now that the invention has been described by way of a detailed description, various improvements, alternatives and equivalents will become apparent to those skilled in the art. Thus, it should be understood that the detailed description has been provided by way of an example and not as a limitation. The scope of the invention is properly defined by the appended claims.

We claim:

1. In a system wherein a client requests services involving a multistage computer process, a method for service level management of the process, comprising the steps of:

defining events describing the potential stages of the process;

monitoring and recording events describing the actual stages of the process;

correlating and collating recorded events into one or more transactions describing service level attributes and the actual stages of the process; and reporting the service level attributes for one or more stages of the process from the one or more transactions.

2. The method of claim 1, wherein said reporting further comprises the step of describing the service level attributes in terms of one of performance, capacity, utilization and availability.

3. The method of claim 1, wherein said correlating and collating further comprises the step of aggregating the recorded events into a subtransaction associated with the process.

4. The method of claim 1, wherein said reporting further comprises the step of aggregating multiple transactions; and reporting statistics for the multiple transactions.

5. The method of claim 1, further comprising the step of defining a transaction as rules linking events.

6. The method of claim 5, further comprising the steps of:

deriving the rules from an external transaction definition;

generating one or more transactions to be reported on, said transactions based on derived rules, wherein said monitoring and recording events are limited to events necessary for said reporting.

7. The method of claim 1, further comprising the steps of:

sensors comparing a change in state against rules for generating events; and generating an event according to the rules, the event describing the change in state, an event identifier, a time stamp, and correlation data.

8. The method of claim 1, wherein the process is a business transaction, further comprising the steps of:

decomposing the business transaction into subtransactions; and reporting the service level attributes associated with the subtransactions.

9. The method of claim 1, further comprising the steps of:

decomposing the process into one or more levels of subtransactions; and said reporting includes the step of interactively reporting a requested level of decomposition.

10. The method of claim 1, for extending the measurement or reporting facilities of the system, further comprising the steps of:

providing APIs and application data structures for defining new events;

providing a language for defining new transactions.

11. The method of claim 1, wherein said correlating and collating recorded events into transactions comprises the steps of:

determining if the recorded events starts the transaction and storing the recorded event within the transaction according to predefined transaction generation rules and controls;

linking the recorded event to events stored within the transaction according to predefined transaction generation rules and controls;

determining if the recorded event completes the transaction, linking and storing the recorded event with the transaction; and storing a completed transaction in response to said determining; wherein said reporting is in response to said storing.

12. The method of claim 1, further comprising the steps of:

dynamically activating a collection of additional sensor events and deactivating the collection of sensor events;

said sensors generating said additional events; and said monitoring and recording includes monitoring and recording said additional events, in response to said generating.

13. A program storage device readable by a machine, tangibly embodying a program of instructions executable by the machine to perform method steps for a service level management of client requests for services involving a multistage computer process, said method steps comprising the steps of:

defining events describing the potential stages of the process;

monitoring and recording events describing the actual stages of the process;

correlating and collating recorded events into one or more transactions describing service level attributes and the actual stages of the process; and reporting the service level attributes for one or more stages of the process from the one or more transactions.

14. The program storage device of claim 13, wherein said reporting further comprises the step of describing the service level attributes in terms of one of performance, capacity, utilization and availability.

15. The program storage device of claim 13, wherein said correlating and collating further comprises the step of aggregating the recorded events into a subtransaction associated with the process.

16. The program storage device of claim 13, wherein said reporting further comprises the step of aggregating multiple transactions; and reporting statistics for the multiple transactions.

17. The program storage device of claim 13, further comprising the step of defining a transaction as rules linking events.

18. The program storage device of claim 17, further comprising the steps of:

deriving the rules from an external transaction definition;

generating one or more transactions to be reported on, said transactions based on derived rules, wherein said monitoring and recording events are limited to events necessary for said reporting.

19. The program storage device of claim 13, further comprising the steps of:

sensors comparing a change in state against rules for generating events; and generating an event according to the rules, the event describing the change in state, an event identifier, a time stamp, and correlation data.

20. The program storage device of claim 13, wherein the process is a business transaction, further comprising the steps of:

decomposing the business transaction into subtransactions; and reporting the service level attributes associated with the subtransactions.

21. The program storage device of claim 13, further comprising the steps of:

decomposing the process into one or more levels of subtransactions; and said reporting includes the step of interactively reporting a requested level of decomposition.

22. The program storage device of claim 13, for extending the measurement or reporting facilities of the system, further comprising the steps of:

providing APIs and application data structures for defining new events;

providing a language for defining new transactions.

23. The program storage device of claim 13, wherein said correlating and collating recorded events into transactions comprises the steps of:

determining if the recorded events starts the transaction and storing the recorded event within the transaction according to predefined transaction generation rules and controls;

linking the recorded event to events stored within the transaction according to predefined transaction generation rules and controls;

determining if the recorded event completes the transaction, linking and storing the recorded event with the transaction; and storing a completed transaction in response to said determining; wherein said reporting is in response to said storing.

24. The program storage device of claim 13, further comprising the steps of:

dynamically activating a collection of additional sensor events and deactivating the collection of sensor events;

said sensors generating said additional events; and said monitoring and recording includes monitoring and recording said additional events, in response to said generating.

25. A computer program product comprising:

computer usable medium having computer readable program code means embodied therein for a service level management of client requests for services involving a multistage computer process, the computer readable program code means in said computer program product comprising:

computer readable program code means for defining events describing the potential stages of the process;

computer readable program code means for monitoring and recording events describing the actual stages of the process;

computer readable program code means for correlating and collating recorded events into one or more transactions describing service level attributes and the actual stages of the process; and computer readable program code means for reporting the service level attributes for one or more stages of the process from the one or more transactions.

26. The computer program product of claim 25, wherein said computer readable program code means for reporting further comprises computer readable program code means for describing the service level attributes in terms of one of performance, capacity, utilization and availability.

27. The computer program product of claim 25, wherein said computer readable program code means for correlating and collating further comprises computer readable program code means for aggregating the recorded events into a subtransaction associated with the process.

28. The computer program product of claim 25, wherein said computer readable program code means for reporting further comprises computer readable program code means for aggregating multiple transactions; and reporting statistics for the multiple transactions.

29. The computer program product of claim 25, further comprising computer readable program code means for defining a transaction as rules linking events.

30. The computer program product of claim 29, further comprising:

computer readable program code means for deriving the rules from an external transaction definition;

computer readable program code means for generating one or more transactions to be reported on, said transactions based on derived rules;

wherein said computer readable program code means for monitoring and recording events are limited to events necessary for said reporting.

31. The computer program product of claim 25, further comprising:

computer readable program code means for comparing a change in state against rules for generating events; and computer readable program code means for generating an event according to the rules, the event describing the change in state, an event identifier, a time stamp, and correlation data.

32. The computer program product of claim 25, wherein the process is a business transaction, further comprising:

computer readable program code means for decomposing the business transaction into subtransactions; and computer readable program code means for reporting the service level attributes associated with the subtransactions.

33. The computer program product of claim 25, further comprising:

computer readable program code means for decomposing the process into one or more levels of subtransactions; and said computer readable program code means for reporting includes computer readable program code means for interactively reporting a requested level of decomposition.

34. The computer program product of claim 25, for extending the measurement or reporting facilities of the system, further comprising:

computer readable program APIs and application data structures for defining new events; and computer readable program code language means for defining new transactions.

35. The computer program product of claim 25, wherein said computer readable program code means for correlating and collating recorded events into transactions comprises:

computer readable program code means for determining if the recorded events starts the transaction and storing the recorded event within the transaction according to predefined transaction generation rules and controls;

computer readable program code means for linking the recorded event to events stored within the transaction according to predefined transaction generation rules and controls;

computer readable program code means for determining if the recorded event completes the transaction, linking and storing the recorded event with the transaction; and computer readable program code means for storing a completed transaction in response to said determining; wherein said reporting is in response to said storing.

36. The computer program product of claim 25, further comprising:

computer readable program code means for dynamically activating a collection of additional sensor events and deactivating the collection of sensor events;

computer readable program code means for generating said additional events; and said computer readable program code means for monitoring and recording includes computer readable program code means for monitoring and recording said additional events, in response to said computer readable program code means for generating.

* * * * *